United States Patent [19]

Petrzilka et al.

[11] Patent Number: 4,783,280

[45] Date of Patent: * Nov. 8, 1988

[54] LIQUID CRYSTAL MIXTURE

[75] Inventors: Martin Petrzilka, Kaiseraugst; Martin Schadt, Seltisberg; Alois Villiger, Basel, all of Switzerland

[73] Assignee: Hoffmann-La Roche Inc., Nutley, N.J.

[*] Notice: The portion of the term of this patent subsequent to Jun. 2, 2001 has been disclaimed.

[21] Appl. No.: 53,601

[22] Filed: May 20, 1987

Related U.S. Application Data

[60] Continuation of Ser. No. 606,329, May 2, 1984, abandoned, which is a division of Ser. No. 387,108, Jun. 10, 1982, Pat. No. 4,460,770.

[30] Foreign Application Priority Data

Jun. 18, 1981 [CH] Switzerland ............... 4038/81
Feb. 26, 1982 [CH] Switzerland ............... 1883/82

[51] Int. Cl.$^4$ .................. G02F 1/13; C09K 19/34; C09K 19/30; C09K 19/12
[52] U.S. Cl. ................ 252/299.61; 252/299.01; 252/299.5; 252/299.63; 252/299.64; 252/299.65; 252/299.66; 252/299.67; 350/346
[58] Field of Search ............ 252/299.01, 299.63, 252/299.5, 299.64, 299.65, 299.66, 299.67, 299.61; 350/346

[56] References Cited

U.S. PATENT DOCUMENTS

| | | | |
|---|---|---|---|
| 3,915,883 | 10/1975 | Van Meter et al. | 252/299.64 |
| 4,009,934 | 3/1977 | Goodwin et al. | 252/299.64 |
| 4,227,778 | 10/1980 | Raynes . | |
| 4,279,770 | 7/1981 | Inukai et al. | 252/299.63 |
| 4,279,771 | 7/1981 | Shionozaki et al. | 252/299.67 |
| 4,287,085 | 9/1981 | Takei et al. | 252/299.67 |
| 4,341,652 | 7/1982 | Takei et al. | 252/299.67 |
| 4,419,262 | 12/1983 | Petrzilka | 252/299.63 |
| 4,439,015 | 3/1984 | Rich et al. | 252/299.63 |
| 4,452,718 | 6/1984 | Schadt et al. | 252/299.61 |
| 4,460,770 | 7/1984 | Petrzilka et al. | 252/299.63 |
| 4,559,161 | 12/1985 | Takei et al. | 252/299.63 |
| 4,566,759 | 1/1986 | McDonnell et al. | 252/299.64 |

FOREIGN PATENT DOCUMENTS

| | | | |
|---|---|---|---|
| 2705805 | 8/1977 | Fed. Rep. of Germany . | |
| 3131450 | 1/1982 | Fed. Rep. of Germany . | |
| 3107528 | 2/1982 | Fed. Rep. of Germany . | |
| 3126362 | 6/1982 | Fed. Rep. of Germany . | |
| 55-21429 | 2/1980 | Japan | 252/299.63 |
| 55-29545 | 3/1980 | Japan | 252/299.63 |
| 55-66556 | 5/1980 | Japan | 252/299.63 |
| 55-84385 | 6/1980 | Japan | 252/299.64 |
| 57-05780 | 1/1982 | Japan | 252/299.63 |
| 57-05782 | 1/1982 | Japan | 252/299.63 |
| 57-05781 | 1/1982 | Japan | 252/299.63 |
| 58-29876 | 2/1983 | Japan | 252/299.63 |
| 58-118886 | 7/1983 | Japan | 252/299.63 |
| 58-142961 | 8/1983 | Japan | 252/299.63 |
| 58-142959 | 8/1983 | Japan | 252/299.63 |
| 58-194972 | 11/1983 | Japan | 252/299.63 |
| 8200654 | 3/1982 | PCT Int'l Appl. | 252/299.63 |
| 2067188 | 7/1981 | United Kingdom . | |
| 2085910 | 5/1982 | United Kingdom | 252/299.63 |
| 2093057 | 8/1982 | United Kingdom . | |
| 2114994 | 9/1983 | United Kingdom | 252/299.63 |

OTHER PUBLICATIONS

Goodwin et al., Research Disclosure No. 131, pp. 28–31 (Mar. 1975).
Freiser et al, IBM Technical Disclosure Bulletin, vol. 17, No. 5, pp. 1498–1501 (Oct. 1974).
Hosokawa et al., SID Digest 1979, pp. 116–117.
Derwent No. 14413 E108–Japanese 57-5783 published Jan. 12, 1982.

*Primary Examiner*—Teddy S. Gron
*Attorney, Agent, or Firm*—Jon S. Saxe; Bernard S. Leon; A. Kate Huffmann

[57] ABSTRACT

There is described a liquid crystalline mixture for electro-optical devices which are operated according to the two-frequency matrix addressing procedure. The mixture consists of three components A, B and C, each of which contains one or more compounds. Component A has a viscosity of at most about 40 cp, a clearing point of at least about 40° C. and a dielectric anisotropy between about −2 and about +1. Component B has a dielectric anisotropy below about −2 both above and below the cross-over frequency of the total mixture and component C has a dielectric anisotropy above about +10, a clearing point of at least about 100° C. and there is a cross-over frequency in the total mixture of at most about 15 kHz at 20° C. Novel compounds for such mixtures and their manufacture and use are also described. The novel mixtures make possible especially high multiplex rates and short response times.

13 Claims, No Drawings

LIQUID CRYSTAL MIXTURE

This application is a continuation of application Ser. No. 606,329, filed May 2, 1984, now abandoned, which is a divisional of Ser. No. 387,108, filed June 10, 1982, now U.S. Pat. No 4,460,770.

BACKGROUND OF THE INVENTION

1. Field of the Invention

The present invention is concerned with novel liquid crystal compounds and mixtures for electro-optical devices which are operated according to the two-frequency matrix addressing procedure, as well as their use in such devices.

2. Description of the Prior Art

Liquid crystal indicating devices have been widely used to display alphanumeric information. In the past, the liquid crystal indicating devices used a direct or static drive procedure to control the display of information.

The customary, static operation of liquid crystal indicating devices however has been replaced by a so-called multiplex control. In this multiplex case there mainly is used an amplitude-selective multiplex procedure whereby maximum multiplex ratios of 1:8 to 1:10 have been attained. To achieve higher multiplex rates in the control of liquid crystal displays, a two-frequency matrix addressing procedure has been proposed (e.g., German Offenlegungsschriften No. 2,856,134 (Great Britain Pat. No. 2,013,014) and 2,907,940 (Great Britain Pat. No. 2,020,075)).

This two-frequency procedure makes use of the fact that the dielectric anisotropy ($\Delta\epsilon$) of nematic liquid crystals having a positive dielectric anisotropy ($\Delta\epsilon = \epsilon_\| - \epsilon_\perp > 0$, $\epsilon_\|$ signifying the dielectric constant along the longitudinal axis of the molecule and $\epsilon_\perp$ signifying the dielectric constant perpendicular thereto) upon application of a low-frequency voltage is negative in the case of a high frequency voltage. More particularly, the value of $\epsilon_\|$ for nematic liquid crystals decreases with increased voltage frequency. This effect has been ascribed to the hindering of the rotation of the long axis of the liquid crystal molecule around the short axis of the liquid crystal molecule (M. Schadt, Mol. Cryst. Liq. Cryst. 66 (1981) 319–336). In contrast to the relationship of $\epsilon_\|$ to voltage frequency, the value of $\epsilon_\perp$ in nematic liquid crystals remains constant except in the microwave frequency range. For $\epsilon_\perp$, dispersion effects only appear in the microwave range because of the barely hindered rotation of the molecule around its longitudinal axis. In the frequency range which is of interest here, $\epsilon_\perp$ is therefore constant, while $\epsilon_\|$ and consequently also $\Delta\epsilon$ are frequency-dependent. The dielectric relaxation frequency, at which $\epsilon_\| = \epsilon_\perp$, is denoted in the technical terminology as the "cross-over frequency" ($f_c$). The most common nematic liquid crystals generally have cross-over frequencies of about 100 kHz and above at room temperature (23° C.)

For the operation of an indicating device according to the two-frequency procedure there are used two alternating current sources, whereby the frequency of one of these sources must lie above the cross-over frequency and the frequency of the other source must lie below the cross-over frequency. Moreover, the voltage ratio of the signals for the on-condition and the off-condition must lie above a certain value. The greater this voltage ratio is, the more lines can be portrayed, i.e. the greater is the multiplex rate.

In addition, the two-frequency procedure offers the advantage that not only the switching-on process, but also the switching-off process can be influenced directly by the application of a corresponding voltage, whereby an acceleration of the switching-off process is achieved. For example, in the case of a liquid crystal indicating element with a twisted nematic structure (rotation cell) the homogeneously orientated liquid crystal can be aligned in the field direction by the application of a voltage of low frequency ($f < f_c$) and can again be converted into the twisted, homogeneous orientation by the application of a voltage of high frequency ($f > f_c$).

Furthermore, with liquid crystal cells which are based on guest-host effects (Applied Physics Letters 13 (1968) 91; D. L. White and G. N. Taylor, J. Appl. Phys. 45 (1974) 4718 inter alia) and which use liquid crystals having positive dielectric anisotropy, it generally is only possible to have colourless image elements on a coloured background. This imaging effect occurs because the colouring substances which are usable mainly exhibit positive dichroism. By homeotropic wall orientation and control according to the two-frequency procedure there can now be produced with such liquid crystals coloured image elements (homogeneously orientated by the application of a voltage of high frequency) on a colourless background.

The two-frequency procedure disadvantageously has high energy consumption since not only the amplitude of the applied alternating voltage but also the frequency are high. To reduce the energy consumption, it is therefore important to maintain a low operating voltage. The cross-over frequency (fc) should for the same reason lie relatively low (thereby the capacitive losses are small).

SUMMARY OF THE INVENTION

Inventive liquid crystalline mixtures have been developed for use in liquid crystal cells using a two-frequency matrix addressing procedure. The inventive mixtures avoid the disadvantages of the prior art by effecting higher multiplex rates and shorter response times.

The mixture in accordance with the invention consists of three components A, B and C, each of which contains one or more compounds, component A having a viscosity (bulk viscosity $\eta$) of at most about 40 cp, a clearing point of at least about 40° C. and a dielectric anisotropy between about $-2$ and about $+1$, component B having a dielectric anisotropy below about $-2$, and component C having a dielectric anisotropy above about $+10$, a clearing point of at least about 100° C. and a cross-over frequency in the total mixture of at most about 15 kHz at 20° C.

The invention is also concerned with novel compounds, which are especially suitable as components in this mixture, their manufacture and their use in liquid crystalline mixtures for two-frequency addressing, electro-optical devices.

DETAILED DESCRIPTION OF THE INVENTION

The mixture in accordance with the invention comprises three components A, B and C, each of which contains one or more compounds, component A having a viscosity (bulk viscosity $\eta$) of at most about 40 cp, a clearing point of at least about 40° C. and a dielectric anisotropy between about $-2$ and about $+1$, component B having a dielectric anisotropy below about −2, and component C having a dielectric anisotropy above about +10, a clearing point of at least about 100° C. There is a cross-over frequency in the total mixture of at most about 15 kHz at 20° C.

Unless otherwise stated, "alkyl" denotes a straight-chain alkyl group of 1 to 12 carbon atoms or a branched-chain alkyl group of 1 to 12 carbon atoms. Exemplary straight-chain alkyl groups are methyl, ethyl, propyl, butyl, pentyl, hexyl, heptyl, octyl, nonyl, decyl, undecyl and dodecyl. Exemplary branched-chain alkyl groups are isopropyl, isobutyl, sec-butyl, 1-methylbutyl, 2-methylbutyl 3-methylpentyl, 4-methylhexyl and isopentyl. Lower alkyl denotes straight-chain and branched-chain alkyl groups of 1 to 5 carbon atoms.

The term "alkoxy" denotes moieties in which its "alkyl" portion is as defined previously. In particular, straight-chain alkoxy groups denote moieties having a straigh-chain alkyl portion as previously defined.

It has now surprisingly been found that the mixtures in accordance with the invention make possible clearly higher multiplex rates and shorter response times compared with the previously known mixtures. For example, it has been established that with mixtures in accordance with the invention the multiplex rates of rotation cells can be readily increased by around the factor 30. On the basis of the low threshold voltages by reversing the frequency even in the case of relatively low control potentials very short turn-off times of about 10 ms can be achieved. Further, the mixtures in accordance with the invention have lower cross-over frequencies and viscosities and at the same time higher absolute dielectric anisotropies than the previously known mixtures. Moreover, in accordance with the proposed mixture concept, by the choice of suitable compounds or by altering their concentrations the low-frequency ("static") dielectric anisotropy $\Delta\epsilon^l$ (measured at frequencies which lie clearly below the cross-over frequency) and the high-frequency dielectric anisotropy $\Delta\epsilon^h$ (measured at frequencies which lie clearly above the cross-over frequency) can be varied independently of one another. This makes it easier especially to optimise the mixtures for different applications.

Some of the compounds and mixtures with the above properties required for the individual components A, B and C basically are known to the person skilled in the art. The total mixture must have nematic or cholesteric properties. Component A can be nematic or cholesteric and component C can be nematic, cholesteric or, as long as the total mixture is not smectic, also smectic. The components A and C must have at least monotropic liquid crystalline properties. However, those mixtures in which at least component C is enantiotropic liquid crystalline are preferred and those mixtures in which components A and B are enantiotropic liquid crystalline are especially preferred. Individual compounds in the mixtures in accordance with the invention and components B can, however, be liquid crystalline or non-liquid crystalline, whereby in the latter case care should be taken that the mesophase range of the total mixture is not restricted too severely.

Compounds and mixtures which are suitable as component A are to a large extent known and many of them are also commercially obtainable. The following compounds or mixtures thereof are especially suitable:

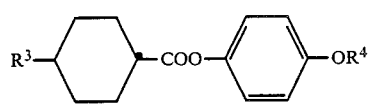
VI

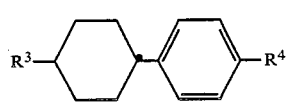
VII

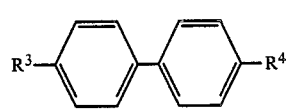
VIII

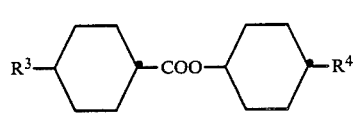
IX

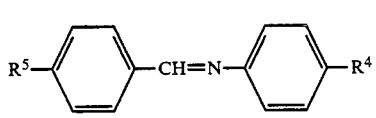
X

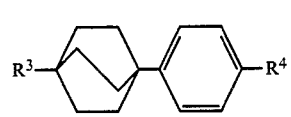
XI

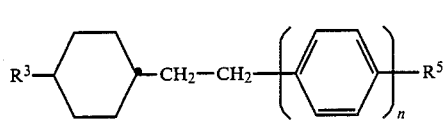
XII

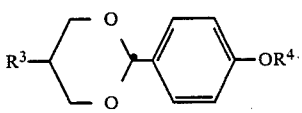
XIX

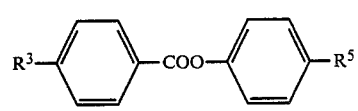
XX

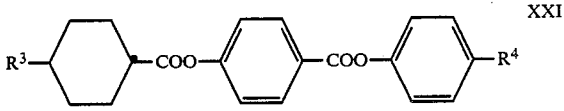
XXI

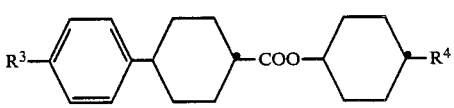
XXII

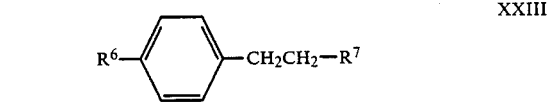
XXIII wherein $R^3$ and $R^4$ each are straight-chain alkyl of 1 to 8 carbon atoms, $R^5$ is straight-chain alkyl or alkoxy of 1 to 8 carbon atoms and n is 1 or 2; $R^6$ is trans-4-alkylcyclohexyl, 4'-alkyl-4-biphenylyl, p-(trans-4-alkylcyclohexyl)phenyl, 2-(trans-4-alkylcyclohexyl)ethyl or p-[2-(trans-4-alkylcyclohexyl)-ethyl]phenyl and $R^7$ is trans-4-alkylcyclohexyl, or $R^6$ is trans-4-alkylcyclohexyl and $R^7$ is p-(trans-4-alkylcyclohexyl)phenyl, p-[2-(trans-4-alkylcyclohexyl)ethyl]phenyl or 4'-(trans-4-alkylcyclohexyl)-4-biphenylyl, or R⁶ is p-alkylphenyl and R⁷ is p-[2-(trans-4-alkylcyclohexyl)-ethyl]phenyl, and the alkyl groups in the substituents R₆ and R⁷ are straight-chain groups of 1 to 7 carbon atoms. Especially preferred are the compounds of formulae VII, IX, XXI, XXII and XXIII and particularly the compounds of formula VI.

Compounds which are suitable for or as component B are, for example, pyridazine derivatives such as, for example, the phenylpyridazines and diphenylpyridazines mentioned in Z. Chemie 17, 333 (1977), J. prakt. Chemie 151, 221 (1938), Z. Chemie 6 467 (1966) and Mol. Cryst. Liq. Cryst. 25, 299 (1974), and especially the compounds which are described in German Offenlegungsschriften No. 2 933 563 and 2 937 700 (U.S. Pat. No. 4,279,770) and which have two lateral cyano groups on a benzene ring. Especially preferred compounds are the dicyanophenyl esters of the formula

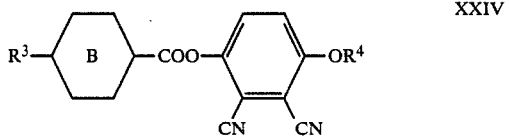

XXIV wherein $R^3$ and $R^4$ each are straight-chain alkyl of 1 to 8 carbon atoms and ring B is p-phenylene or trans-1,4-disubstituted cyclohexane, and especially the cyclohexylpyridazines of the formula

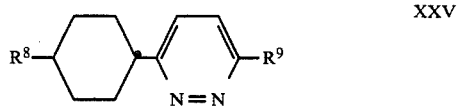

XXV wherein $R^8$ is a straight-chain alkyl of 1 to 12 carbon atoms, $R^9$ is alkyl, alkoxy, p-alkylphenyl, p-alkoxyphenyl or trans-4-alkylcyclohexyl and the alkyl and alkoxy groups in $R^9$ are straight-chain groups of 1 to 10 carbon atoms. Under the aforementioned "dielectric anisotropy" of component B there is to be understood in the case of non-liquid crystalline components the extrapolated value (from liquid crystalline mixtures which contain these components) of the dielectric anisotropy at a temperature which lies about 10° C. below the extrapolated (virtual) clearing point. For example, the aforementioned pyridazines have dielectric anisotropies of about −9.

For or as component C there are suitable, for example, compounds containing 3 or 4 p-phenylene or trans-1,4-cyclohexylene groups, a polar terminal group (e.g. cyano or 2,2-dicyanovinyl) and optionally a lateral halogen or cyano substituent. Such compounds are partly known and are described, for example, in Mol. Cryst. Lig. Cryst. 63, 129 (1981) and in the German Offenlegungsschriften No. 2 736 772 (U.S. Pat. Nos. 4,149,413), 2 752 975 (U.S. Pat. Nos. 4,293,434) and 3,046,872 (Great Britain Pat. No. 2,067,188) or can be made from known compounds by conventional techiques. Further, compounds of the formula

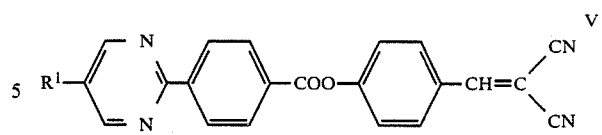

V wherein $R^1$ is straight-chain alkyl of 1 to 12 carbon atoms, can also be used.

However, the compounds of the

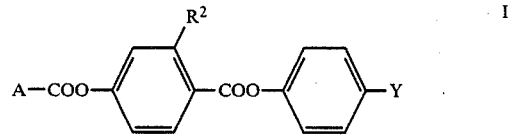

I wherein $R^2$ is hydrogen, fluorine, chlorine, bromine or cyano, Y is 2,2-dicyanovinyl, 2,2-dicyano-1-methylvinyl or cyano, A is p-R¹-phenyl, trans-4-R¹-cyclohexyl, 4'-R¹-4-biphenylyl, p-(trans-4-R¹-cyclohexyl)phenyl, p-(5-R¹-2-pyrimidinyl)phenyl, p-[2-(p'-R¹-phenyl)ethyl]phenyl, p-[2-(trans-4-R¹-cyclohexyl)ethyl]phenyl, trans-4-[2-(p-R¹-phenyl)ethyl]cyclohexyl or trans-4-[2-(trans-4-R¹-cyclohexyl)ethyl]cyclohexyl, and R¹ is straight-chain alkyl of 1 to 12 carbon atoms or when A is p-R¹-phenyl, 4'-R¹-4-biphenylyl, p-[2-(p'-R¹-phenyl)ethyl]phenyl or trans-4-[2-(p-R¹-phenyl)ethyl]cyclohexyl, R¹ also can be straight-chain alkoxy of 1 to 12 carbon atoms, have been found to be especially suitable compounds for component C. These compounds have a large nematic mesophase range with high clearing points and especially large absolute dielectric anisotropies. In general, at room temperature (about 23° C.) the cross-over frequencies of liquid crystal mixtures which contain 3-ring compounds of formula I lie at about 10 kHz or below and the cross-over frequencies of liquid crystal mixtures which contain 4-ring compounds of formula I lie at about 1 kHz. The compounds of formula I have in the case of frequencies below the cross-over frequency a large positive dielectric anisotropy and in the case of frequencies above the cross-over frequency a large negative dielectric anisotropy. These properties make possible especially high multiplex rates and a low energy consumption in the operation of indicating devices according to the two-frequency procedure.

Of the compounds of formula I above there are preferred those wherein R² is cyano or chlorine, especially chlorine. R¹ is preferably alkyl. Y preferably denotes cyano or 2,2-dicyano-1-methylvinyl. Further, there are preferred the 4-ring compounds of formula I, especially those wherein A is 4'-alkyl-4-biphenylyl, p-(trans-4-alkylcyclohexyl)phenyl or p-[2-(trans-4-alkylcyclohexyl)ethyl]phenyl. Preferred alkyl and alkoxy R¹ groups are those containing 2 to 10 carbon atoms and especially those containing 4 to 8 carbon atoms. The mixtures in accordance with the invention preferably contain at least two or three compounds of formula I above.

Mixtures in accordance with the invention which have cross-over frequencies of at most about 10 kHz at 20° C. are preferred and those mixtures which have cross-over frequencies of at most about 5 kHz are especially preferred. The amount of the individual components in the total mixture conveniently amounts to at least about 30 wt.% for component A, about 3–40 wt.% for component B and about 5–40 wt.% for component C. Preferred concentration ranges are about 40–87 wt.% for component A, about 3-30 wt.% for component B and about 10-30 wt.% for component C.

The mixtures in accordance with the invention can also contain (depending on properties as constituents of components A, B and C) optically active compounds, for example optically active biphenyls, and/or dichroic colouring substances, for example azo, azoxy or anthraquinone colouring substances. The amount of such compounds is determined by the solubility, the desired pitch, colour, extinction and the like. The amount of optically active compounds preferably amounts to about 4 wt.% and the amount of dichroic colouring substance preferably amounts to about 10 wt.%, these percentages being based on the total mixture.

The liquid crystalline mixtures in accordance with the invention can be manufacture in a manner known per se; for example, by heating a mixture of the constituents to a temperature barely above the clearing point and subsequently cooling said mixture.

The production of an electro-optical device containing a mixture in accordance with the invention can also be carried out in a manner known per se; for example, by evacuating a suitable cell and introducing the mixturek into the evacuated cell.

The compounds of formula I above in which Y is cyano and A is p-$R^1$-phenyl or trans-4-$R^1$-cyclohexyl are known or can be made from known compounds by conventional techniques. The remaining compounds of formula I, i.e. the compounds in which $R^2$ is hydrogen, fluorine, chlorine, bromine or cyano; Y is 2,2-dicyanovinyl or 2,2-dicyano-1-methylvinyl and A is p-$R^1$-phenyl or trans-4-$R^1$-cyclohexyl; or Y is 2,2-dicyanovinyl, 2,2-dicyano-1-methylvinyl or cyano and A is 4'-$R^1$-4-biphenylyl, p-(trans-4-$R^1$-cyclohexyl)phenyl, p-(5-$R^1$-2-pyrimidinyl)phenyl, p-[2-(p'-$R^1$-phenyl)ethyl]phenyl, p-[2-(trans-4-$R^1$-cyclohexyl)ethyl]phenyl, trans-4-[2-(p-$R^1$-phenyl)ethyl]cyclohexyl or trans-4-[2-(trans-4-$R^1$-cyclohexyl)ethyl]cyclohexyl; and $R^1$ is straight-chain alkyl of 1 to 12 carbon atoms or when A is p-$R^1$-phenyl, 4'-$R^1$-4-biphenylyl, p-[2-(p'-$R^1$-phenyl)ethyl]phenyl or trans-4-[2-(p-$R^1$-phenyl)ethyl]cyclohexyl, $R^1$ also can be straight-chain alkoxy of 1 to 12 carbon atoms, are novel and likewise form an object of the present invention. They are preferred over the known compounds of formula I above and, inter alia, generally have improved cross-over frequencies. Especially preferred are the compounds in accordance with the invention which are referred to above as being preferred in connection with component C. Examples of preferred compounds are the compounds of formula I named in the synthetis Examples 6-11 hereinafter.

Among the compounds of formula I in accordance with the invention there also fall, for example, the compounds of the formula

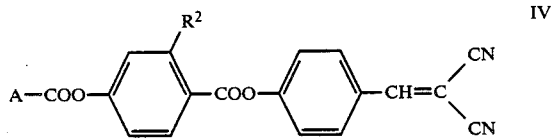

IV wherein $R^1$ is straight-chain alkyl of 1 to 12 carbon atoms and $R^2$ is fluorine, chlorine, bromine or cyano and A is p-alkylphenyl, trans-4-alkylcyclohexyl, 4'-alkyl-4-biphenylyl, p-(trans-4-alkylcyclohexyl)phenyl or p-(5-alkyl-2-pyrimidinyl)phenyl.

The novel compounds of formula I can be manufactured in accordance with the invention by esterifying an acid of the formula

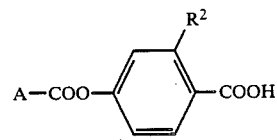

XIII or a reactive derivative thereof with a compound of the formula

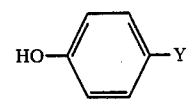

XIV wherein $R^2$ is hydrogen, fluorine, chlorine or bromine; Y is 2,2-dicyanovinyl or 2,2-dicyano-1-methylvinyl and A is p-$R^1$-phenyl or trans-4-$R^1$-cyclohexyl; or Y is 2,2-dicyanovinyl, 2,2-dicyano-1-methylvinyl or cyano and A is 4'-$R^1$-4-biphenylyl, p-(trans-4-$R^1$-cyclohexyl)phenyl, p-(5-$R^1$-2-pyrimidinyl)phenyl, p-[2-(p'-$R^1$-phenyl)ethyl]phenyl, p-[2-(trans-4-$R^1$-cyclohexyl)ethyl]phenyl, trans-4-[2-(p-$R^1$-phenyl)ethyl]cyclohexyl or trans-4-[2-(trans-4-$R^1$-cyclohexyl)ethyl]cyclohexyl, and $R^1$ is straight-chain alkyl of 1 to 12 carbon atoms or when A is p-$R^1$-phenyl, 4'-$R^1$-4-biphenylyl, p-[2-(p'-$R^1$-phenyl)ethyl]phenyl or trans-4-[2-(p-$R^1$-phenyl)ethyl]cyclohexyl, $R^1$ also is straight-chain alkoxy of 1 to 12 carbon atoms. If desired, the resulting compound of formula I in which $R^2$ is bromine can be reacted with copper (I) cyanide, sodium cyanide or potassium cyanide.

The esterification of an acid of formula XIII or of a reactive derivative thereof (e.g. acid chloride or acid anhydride) with a phenol of formula XIV can be carried out in a manner known per se. For example, a carboxylic acid of formula XIII can be esterified with a compound of formula XIV in the presence of a catalytic amount of a strong acid such as sulphuric acid or a hydrohalic acid, in the presence or absence of an inert organic solvent. However, a preferred method is the reaction of the acid chloride (which can be obtained from the acid of formula XIII, for example, by heating with thionyl chloride) with the phenol of formula XIV. This reaction is conveniently carried out in an inert organic solvent, for example an ether such as diethyl ether or tetrahydrofuran, or dimethylformamide, benzene, toluene, cyclohexane, carbon tetrachloride and the like. In order to bind the hydrogen chloride liberated in the reaction, there is conveniently used an acid-binding agent, for example tertiary amines, pyridines and the like. The acid-binding agent is preferably used in a large excess, so that it can simultaneously serve as the solvent. Temperature and pressure for these esterification reactions are not critical and in general atmospheric pressure and a temperature between about room temperature (23° C.) and about the boiling point of the reaction mixture are used.

A resulting compound of formula I in which $R^2$ signifies bromine can, if desired, be converted into the corresponding cyano compound (a compound of formula I in which $R^2$ signifies cyano) in a manner known per se with copper (I) cyanide, sodium cyanide or potassium cyanide. The reaction is conveniently carried out in an inert organic solvent, for example in ethylene glycol, tetrahydrofuran, N-methylpyrrolidone, dimethylformamide, dimethyl sulphoxide, pyridine or acetonitrile. The reaction with copper (I) cyanide in dimethylformamide is preferred. The temperature and pressure are not critical aspects in this reaction. The reaction is conveniently carried out at atmospheric pressure and a temperature between about room temperature (23° C.) and about the boiling point of the reaction mixture.

The compounds of formula XIV and the compounds of formula XIII in which A is p-$R^1$-phenyl or trans-4-$R^1$-cyclohexyl are known or can be prepared from known compounds by conventional techniques. The remaining compounds of formula XIII, i.e. those in which A is 4'-$R^1$-4-biphenylyl, p-(trans-4-$R^1$-cyclohexyl)phenyl, p-(5-$R^1$-2-pyrimidinyl)phenyl, p-[2-(p'-$R^1$-phenyl)ethyl]phenyl, p-[2-[2-(trans-4-$R^1$-cyclohexyl)ethyl]phenyl, trans-4-[2-(p-$R^1$-phenyl)ethyl]cyclohexyl or trans-4-[2-(trans-4-$R^1$-cyclohexyl)ethyl]cyclohexyl are novel and likewise form an object of the present invention. For the most part they likewise possess liquid crystalline properties.

The compounds of formula XIII can be obtained on the basis of the following Reaction Scheme in which $R^1$, $R^2$ and A have the significances given in formula XIII above:

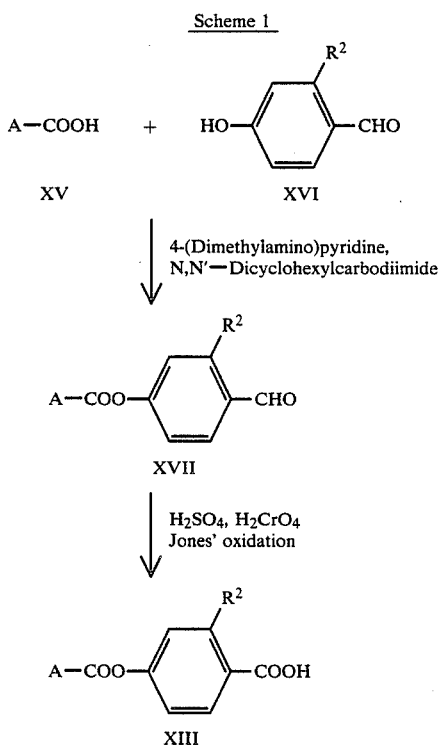

The compounds of formulae XV and XVI are known or can be prepared in a known manner from known compounds by conventional techniques.

The compounds of formulae V, XII, XXIII and XXV above are likewise novel and also form objects of the present invention.

The compounds of formula V can be obtained in an analogous manner to the compounds of formula I. A preferred method is the reaction of the corresponding acid with p-(2,2-dicyanovinyl)phenol in the presence of 4-(dimethylamino)pyridine and N,N'-dicyclohexylcarbodiimide. The acids required for this method can be prepared in a manner known per se by subjecting the known, liquid crystalline p-(5-alkyl-2-pyrimidinyl)benzonitriles to saponification (e.g. by heating with potassium hydroxide in ethylene glycol and subsequent addition of a mineral acid).

The compounds of formula XII can be obtained by reducing a compound of the formula

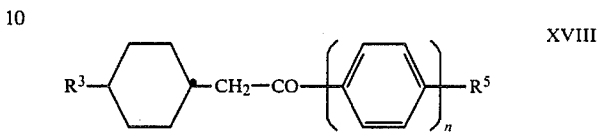

wherein $R^3$, $R^5$ and n have the above significances, in a manner known per se; for example, by Clemmensen reduction or using hydrazine according to the Huang-Minlon process. The compounds of formula XVIII can be prepared by Friedel-Crafts acylation of an alkyl- or alkoxybenzene or of a 4-alkyl- or 4-alkoxybiphenyl with the acid chloride of a (trans-4-alkylcyclohexyl)acetic acid.

The compounds of formula XXIII can be obtained on the basis of the following Reaction Schemes 2 and 3 in which $R^{10}$ represents trans-4-alkylcyclohexyl, 4'-alkyl-4-biphenylyl, p-(trans-4-alkylcyclohexyl)phenyl or 2-(trans-4-alkylcyclohexyl)ethyl and $R^{11}$ represents trans-4-alkylcyclohexyl, or $R^{10}$ represents trans-4-alkylcyclohexyl and $R^{11}$ represents p-(trans-4-alkylcyclohexyl)phenyl, p-[2-(trans-4-alkylcyclohexyl)ethyl]phenyl or 4'-(trans-4-alkylcyclohexyl)-4-biphenylyl, or $R^{10}$ represents p-alkylphenyl and $R^{11}$ represents p-[2-(trans-4-alkylcyclohexyl)ethyl]phenyl, and $R^{12}$ and $R^{13}$ as well as the alkyl groups in the substituents $R^{10}$ and $R^{11}$ are straight-chain alkyl groups containing 1 to 7 carbon atoms.

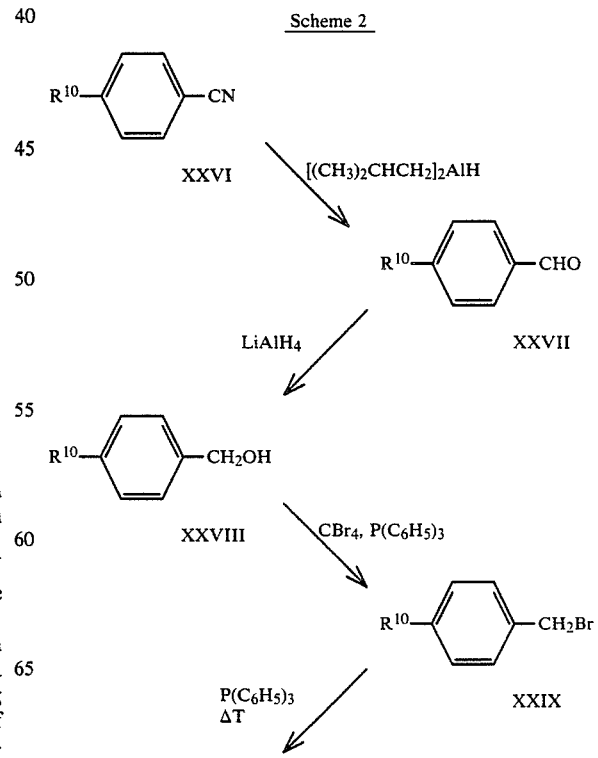

-continued
Scheme 2

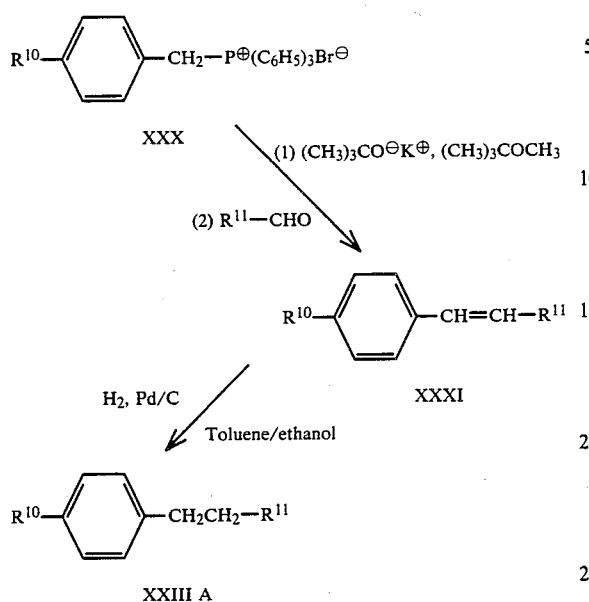

Scheme 3

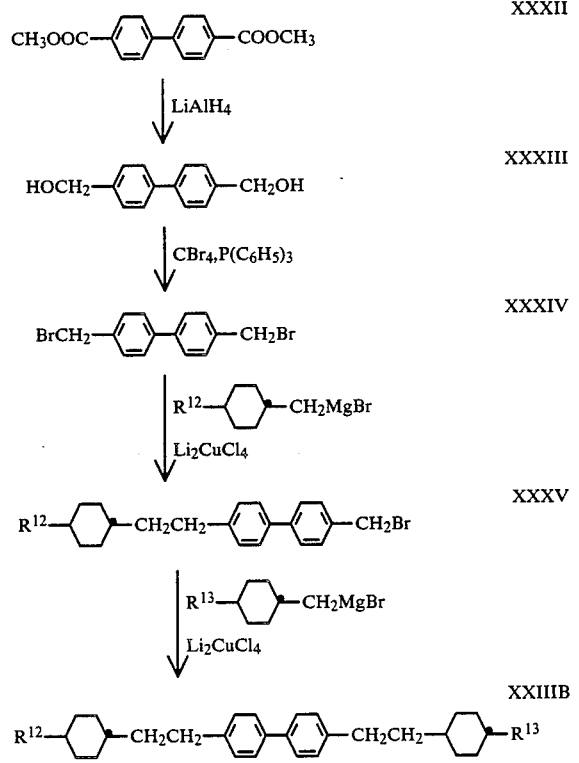

The compounds of the formula $R^{11}$—CHO in Scheme 2 can be prepared in a simple manner from known compounds; for example, the trans-4-alkylcyclohexanecarboxaldehydes can be prepared by Rosenmund reduction of the corresponding acid chlorides and the remaining compounds can be prepared by reduction of the corresponding cyano compounds (in an analogous manner to the preparation of the compounds of formula III).

By reacting the compound of formula XXXIV with Grignard reagents in accordance with Scheme 3 there can be obtained compounds of formula XXXV or directly compounds of formula XXIIIB in which $R^{12}$ and $R^{13}$ have the same significance. When at least about 2 mol of Grignard reagent are used per mol of the compound of formula XXXIV there is in general mainly formed directly a compound of formula XXIIIB.

The compounds of formula XXV can be obtained by (a) for the preparation of the compounds of formula XXV in which $R^9$ represents an alkyl, p-alkylphenyl, p-alkoxyphenyl or trans-4-alkylcyclohexyl group, oxidizing a compound of the formula

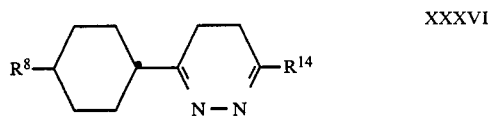   XXXVI wherein $R^{14}$ represents an alkyl, p-alkylphenyl, p-alkoxyphenyl or trans-4-alkylcyclohexyl group, the alkyl and alkoxy groups in $R^{14}$ are straight-chain groups containing 1 to 10 carbon atoms, and $R^8$ has the above significance, or a tautomeric dihydropyridazine, or (b) for the manufacture of the compounds of formula XXV in which $R^9$ represents an alkoxy group, reacting a compound of the general formula

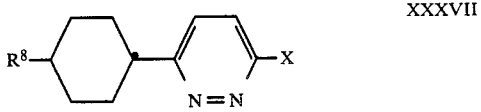   XXXVII wherein X denotes chlorine or bromine and $R^8$ has the above significance, with an alkali metal alcoholate.

The oxidation of a compound of formula XXXVI can be carried out in a manner known per se; for example, with 2,3-dichloro-5,6-dicyano-p-benzoquinone in dioxan, with sodium nitrite in glacial acetic acid and ethanol, with isopentyl nitrite in glacial acetic acid and the like. Temperature and pressure are not critical aspects in this reaction. However, atmospheric pressure and a temperature between room temperature and the reflux temperature, preferably about room temperature, are conveniently used. The compounds of formula XXVI are, however, preferably oxidized to compounds of formula I by catalytic dehydrogenation in a manner known per se. The dehydrogenation can be carried out with any catalyst which is usually used in dehydrogenation reactions, examples of such catalysts being palladium, platinium and the like (optionally on an inert carrier material such as carbon). Palladium is the preferred catalyst. As the solvent there can be used any inert organic solvent such as alcohols, ethers esters, carboxylic acids and the like, for example ethanol, dioxan, ethyl acetate or glacial acetic acid. Ethanol is the preferred solvent. Temperature and pressure are not critical aspects in this reaction. A temperature between room temperature (about 23° C.) and the reflux temperature of the reaction mixture and atmospheric pressure are conveniently used.

The compounds of formula XXXVI can rearrange to tautomeric compounds by migration of the double bonds in the dihydropyridazine ring. Such rearrangements can be brought about, for example, by the presence of a trace of acid or base. Since, however, the tautomeric dihydropyridazines can also be oxidized under the above conditions to give compounds of formula XXV, not only a compound of formula XXXVI, but also a tautomeric dihydropyridazine or a mixture of such compounds can be used in process variant (a).

The reaction of a compound of formula XXXVII with an alkali metal alcoholate can be carried out in a manner known per se. Sodium is the preferred alkali metal. As the solvent there can be used any inert organic solvent such as ethers, saturated or aromatic hydrocarbons and the like, for example benzene, toluene, hexane, diethyl ether or dioxan. Preferably, however, there is used as the solvent the alcohol corresponding to the alcoholate (optionally in combination with another inert organic solvent). In this case, the alcoholic solution of the alcoholate is conveniently prepared by reacting an excess of the alcohol with sodium, sodium hydride, potassium hydride and the like. Temperature and pressure are not critical aspects in the reaction of the compounds of formula XXXVII with an alkali metal alcoholate. Atmospheric pressure and a temperature between room temperature and the reflux temperature of the reaction mixture, preferably about 40 to about 60° C., are conveniently used.

The starting materials for formulae XXXVI and XXXVII are novel and likewise form objects of the present invention. They can be prepared on the basis of the following Reaction Schemes A-D in which $R^8$, $R^{14}$ and X have the above significances and $R^{15}$ represents a straight-chain alkyl or alkoxy group containing 1 to 10 carbon atoms:

Scheme A

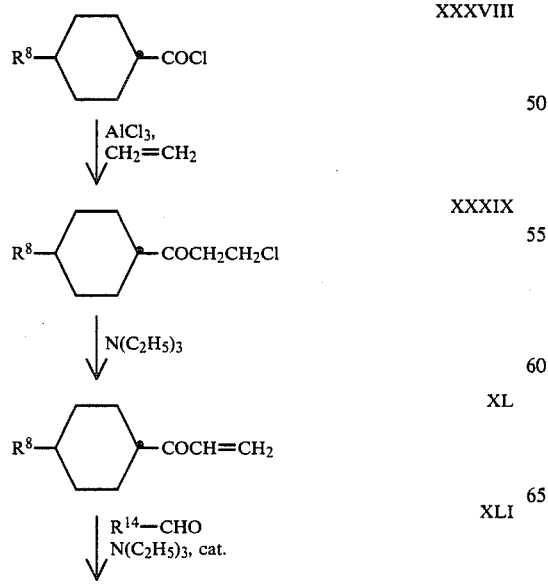

Scheme A -continued

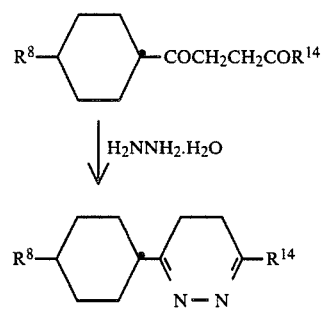

Scheme B

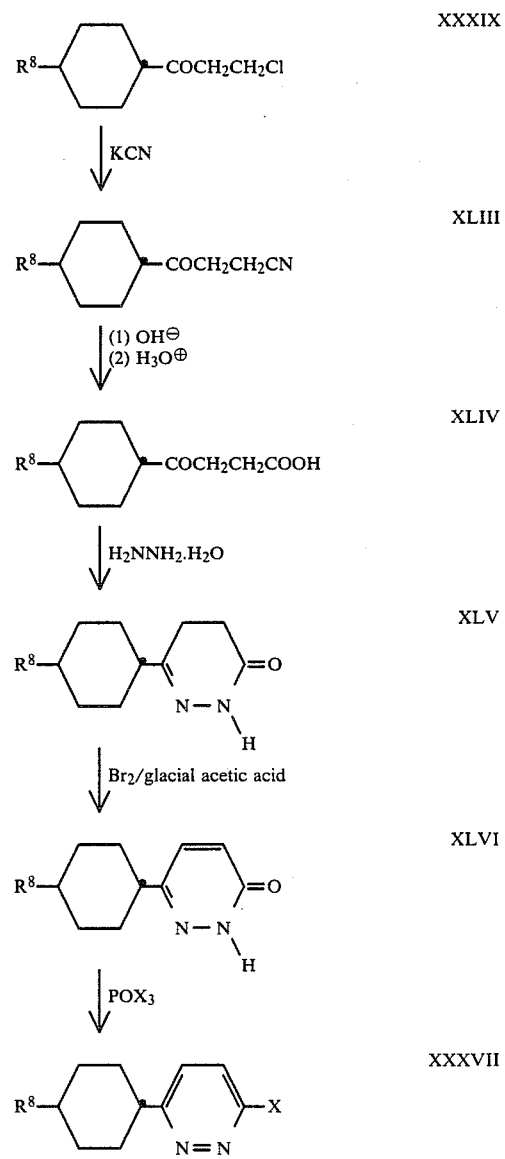

4,783,280
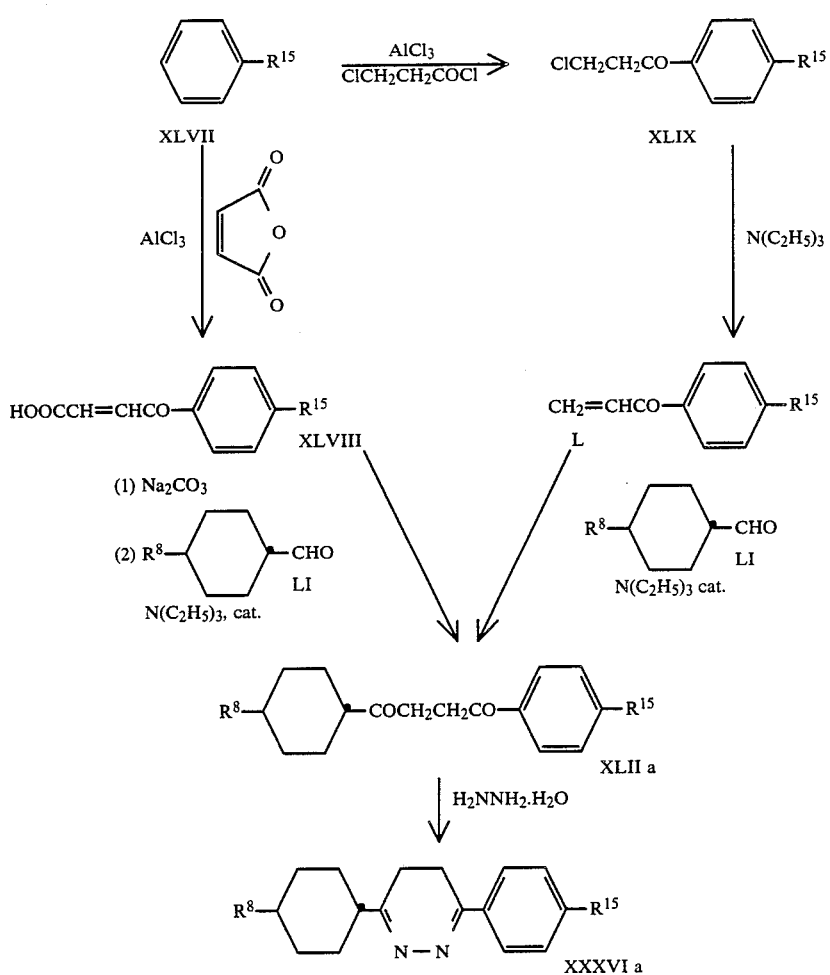
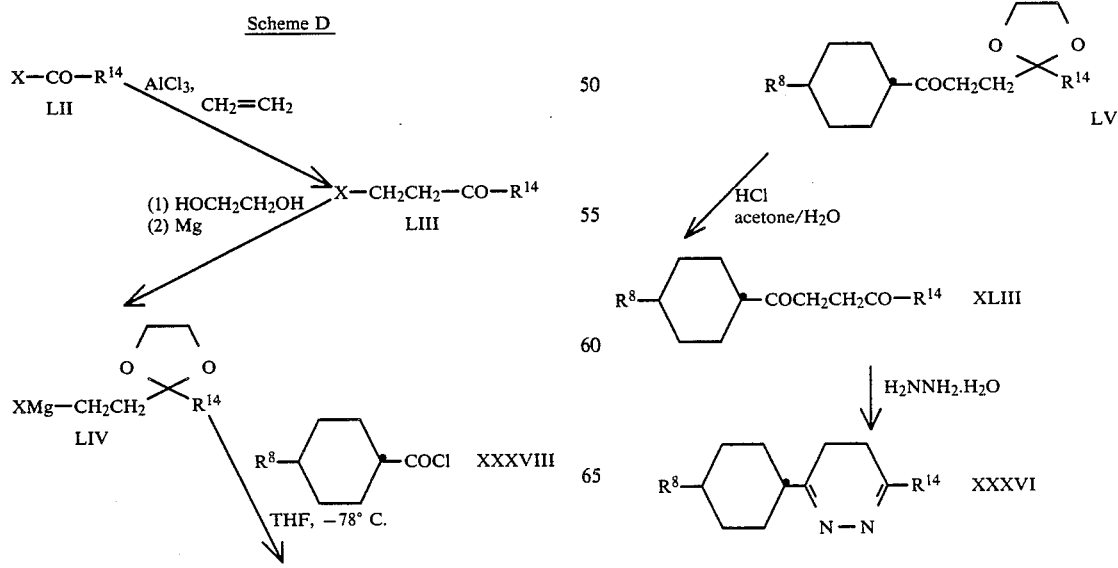

The starting materials of formulae XXXVIII, XLI, XLVII, LI and LII are known or are analogues of known compounds and can be prepared in a known manner. For example, the aldehydes of formula LI can be prepared by Rosenmund reduction of the acid chlorides of formula XXXVIII.

The addition of an aldehyde to a compound of formula XL, XLVIII or L can be carried out according to the method of Stetter [Chem. Ber. 114 (1981) 581] in the presence of a 1,3-thiazolium salt catalyst. 3-Benzyl-5-(2-hydroxyethyl)-4-methyl-1,3-thiazolium chloride is the preferred catalyst for the addition of an aldehyde of formula LI or of an aldehyde of formula XLI in which $R^{14}$ signifies alkyl or trans-4-alkylcyclohexyl and 3,4-dimethyl-5-(2-hydroxyethyl)-1,3-thiazolium iodide is the preferred catalyst for the addition of an aldehyde of formula XLI in which $R^{14}$ signifies p-alkylphenyl or p-alkoxyphenyl.

The coupling of a compound of formula LIV with a compound of formula XXXVIII can be carried out according to the method described by T. Sato et al in Bull. Chem. Soc. Japan 54 (1981) 505.

As already mentioned above, the compounds of formula XXXVI can also be present in tautomeric form or as mixtures of tautomeric forms.

The invention is also concerned with all novel compounds, mixtures, processes, uses and devices as described herein.

In the following non-limiting Examples 1–11, C denotes a crystalline phase, S denotes a smetic phase, N denotes a nematic phase and I denotes an isotropic phase.

The following mixtures illustrate preferred components A, B and C and of preferred total mixtures. The relationship of the individual constituents of the total mixtures to the components A, B and C follows from the details given earlier.

EXAMPLE 1

Mixture Examples for component A:

Basic Mixture A1

38.0 wt.% of p-methoxybenzylidene-p'-butylaniline,
18.6 wt.% of trans-4-butylcyclohexanecarboxylic acid p-ethoxyphenyl ester,
17.5 wt.% of trans-4-pentylcyclohexanecarboxylic acid p-methoxyphenyl ester,
25.9 wt.% of trans-4-pentylcyclohexanecarboxylic acid p-propyloxyphenyl ester,
m.p. <0° C.; cl.p. (N-I) 61.3° C.

Basic Mixture A2

21.9 wt.% of trans-4-butylcyclohexanecarboxylic acid p-ethoxyphenyl ester,
29.2 wt.% of trans-4-butylcyclohexanecarboxylic acid p-pentyloxyphenyl ester,
19.9 wt.% of trans-4-pentylcyclohexanecarboxylic acid p-methoxyphenyl ester,
29.0 wt.% of trans-4-pentylcyclohexanecarboxylic acid p-propyloxyphenyl ester,
m.p. <0° C.; cl.p. (N-I) 69.0° C.

Basic Mixture A3

20.2 wt.% of trans-4-butylcyclohexanecarboxylic acid p-ethoxyphenyl ester,
27.2 wt.% of trans-4-butylcyclohexanecarboxylic acid p-pentyloxyphenyl ester,
18.3 wt.% of trans-4-pentylcyclohexanecarboxylic acid p-methoxyphenyl ester,
25.1 wt.% of trans-4-pentylcyclohexanecarboxylic acid p-propyloxyphenyl ester,
9.2 wt.% of 4-[(trans-4-butylcyclohexyl)carbonyloxy]-benzoic acid p-butylphenyl ester,
m.p. <0° C.; cl.p. (N-I) 78° C.

Basic Mixture A4

14.2 wt.% of trans-4-butylcyclohexanecarboxylic acid p-ethoxyphenyl ester,
18.4 wt.% of trans-4-butylcyclohexanecarboxylic acid p-pentyloxyphenyl ester,
12.3 wt.% of trans-4-pentylcyclohexanecarboxylic acid p-methoxyphenyl ester,
17.6 wt.% of trans-4-pentylcyclohexanecarboxylic acid p-propyloxyphenyl ester,
32.1 wt.% of 2-(trans-4-pentylcyclohexyl)-1-(p-ethoxyphenyl)ethane,
5.4 wt.% of 4-[(trans-4-butylcyclohexyl)carbonyloxy]-benzoic acid p-butylphenyl ester,
m.p. <−10° C.; cl.p. (N-I) 64.4° C.; $\epsilon_{\parallel}=3.08$, $\Delta\epsilon=-0.92$.

Basic Mixture A5

19.9 wt.% of trans-4-butylcyclohexanecarboxylic acid p-ethoxyphenyl ester,
28.1 wt.% of trans-4-butylcyclohexanecarboxylic acid p-pentyloxyphenyl ester,
18.0 wt.% of trans-4-pentylcyclohexanecarboxylic acid p-methoxyphenyl ester,
21.7 wt.% of trans-4-pentylcyclohexanecarboxylic acid p-propyloxyphenyl ester,
12.3 wt.% of 2-(trans-4-pentylcyclohexyl)-1-(p-ethoxyphenyl)ethane,
m.p. <0° C.; cl.p. (N-I) 64.9° C.

Basic Mixture A6

9.9 wt.% of trans-4-butylcyclohexanecarboxylic acid p-ethoxyphenyl ester,
9.9 wt.% of trans-4-pentylcyclohexanecarboxylic acid p-methoxyphenyl ester,
16.3 wt.% of trans-4-pentylcyclohexanecarboxylic acid p-propyloxyphenyl ester,
23.3 wt.% of 2-(trans-4-propylcyclohexyl)-1-(p-ethoxyphenyl)ethane,
27.6 wt.% of 2-(trans-4-pentylcyclohexyl)-1-(p-ethoxyphenyl)ethane,
13.0 wt.% of 2-(trans-4-pentylcyclohexyl)-1-(4'-ethyl-4-biphenylyl)ethane,
m.p. <−10° C.; cl.p. (N-I) 61.4°–61.8° C.; $\eta(22°$ C.$)=14.2$ cp; $\epsilon_{\parallel}$ (22° C.)$=2.88$; $\Delta\epsilon(22°$ C.$)=-0.60$.

Basic Mixture A7

8.7 wt.% of trans-4-butylcyclohexanecarboxylic acid p-ethoxyphenyl ester,
8.7 wt.% of trans-4-pentylcyclohexanecarboxylic acid p-methoxyphenyl ester,
14.9 wt.% of trans-4-pentylcyclohexanecarboxylic acid p-propyloxyphenyl ester,
21.0 wt.% of 2-(trans-4-propylcyclohexyl)-1-(p-ethoxyphenyl)ethane,
25.1 wt.% of 2-(trans-4-pentylcyclohexyl)-1-(p-ethoxyphenyl)ethane,
12.7 wt.% of 2-(trans-4-pentylcyclohexyl)-1-(4'-ethyl-4-biphenylyl)ethane,
8.9 wt.% of trans-4-(p-pentylphenyl)cyclohexanecarboxylic acid trans-4-propylcyclohexyl ester, m.p. $<-10°$ C.; cl.p. (N-I) 64.6°–65.2° C.; $\eta(22°$ C.)=15.7 cp; $\epsilon_\parallel$ (22° C.)=2.86; $\Delta\epsilon$(22° C.)=−0.65.

Basic Mixture A8

8.7 wt.% of trans-4-butylcyclohexanecarboxylic acid p-ethoxyphenyl ester,
7.7 wt.% of trans-4-pentylcyclohexanecarboxylic acid p-methoxyphenyl ester,
13.7 wt.% of trans-4-pentylcyclohexanecarboxylic acid p-propyloxyphenyl ester,
27.9 wt.% of trans-4-propylcyclohexanecarboxylic acid trans-4-propylcyclohexyl ester,
23.0 wt.% of 2-(trans-4-pentylcyclohexyl)-1-(p-ethoxyphenyl)ethane,
11.5 wt.% of 2-(trans-4-pentylcyclohexyl)-1-(4'-ethyl-4-biphenylyl)ethane,
7.5 wt.% of trans-4-(p-pentylphenyl)cyclohexanecarboxylic acid trans-4-propylcyclohexyl ester, m.p. $<-10°$ C.; cl.p. (N-I) 62.3°–62.6° C.; $\eta$ (22° C.)=15.8 cp; $\epsilon_\parallel$ (22° C.)=2.88; $\Delta\epsilon$ (22° C.)=−0.92.

Basic Mixture A9

10.9 wt.% of trans-4-butylcyclohexanecarboxylic acid p-ethoxyphenyl ester,
9.9 wt.% of trans-4-pentylcyclohexanecarboxylic acid p-methoxyphenyl ester,
17.3 wt.% of trans-4-pentylcyclohexanecarboxylic acid p-propyloxyphenyl ester,
24.1 wt.% of 2-(trans-4-propylcyclohexyl)-1-)p-ethoxyphenyl)ethane,
27.5 wt.% of 2-(trans-4-pentylcyclohexyl)-1-(p-ethoxyphenyl)ethane,
10.3 wt.% of trans-4-(p-pentylphenyl)cyclohexanecarboxylic acid trans-4-propylcyclohexyl ester, m.p. $<-10°$ C.; cl.p. (N-I) 55.1° C.; $\eta$ (22° C.)=14.4 cp; $\Delta_\parallel$ (22° C.)=2.91; $\Delta\epsilon$ (22° C.)=−0.80.

Basic Mixture A10

19.3 wt.% of trans-4-butylcyclohexanecarboxylic acid p-ethoxyphenyl ester,
26.2 wt.% of trans-4-butylcyclohexanecarboxylic acid p-pentyloxyphenyl ester,
17.5 wt.% of trans-4-pentylcyclohexanecarboxylic acid p-methoxyphenyl ester,
26.1 wt.% of trans-4-pentylcyclohexanecarboxylic acid p-propyloxyphenyl ester,
10.9 wt.% of trans-4-(p-pentylphenyl)cyclohexanecarboxylic acid trans-4-propylcyclohexyl ester, m.p. $<0°$ C.; cl.p. (N-I) 72.1° C.

EXAMPLE 2

Mixture Examples for component B:

Basic Mixture B1

24.5 wt.% of 3-phenyl-6-(p-pentylphenyl)pyridazine,
15.5 wt.% of 3-pentyloxy-6-(p-pentylphenyl)pyridazine,
60.0 wt.% of 3-pentyl-6-(trans-4-pentylcyclohexyl)-pyridazine, cl.p. (S-I) 59.0°–59.6° C.

Basic Mixture B2

24.3 wt.% of 3-propyl-6-(trans-4-ethylcyclohexyl)-pyridazine,
22.6 wt.% of 3-propyl-6-(trans-4-pentylcyclohexyl)-pyridazine,
15.2 wt.% of 3-propyl-6-(trans-4-heptylcyclohexyl)-pyridazine,
30.4 wt.% of 3-pentyl-6-(trans-4-pentylcyclohexyl)-pyridazine,
7.5 wt.% of 3-(p-pentylphenyl)-6-(trans-4-propylcyclohexyl)pyridazine.

Basic Mixture B3

10.4 wt.% of 3-propyl-6-(trans-4-ethylcyclohexyl)-pyridazine,
25.5 wt.% of 3-propyl-6-(trans-4-pentylcyclohexyl)-pyridazine,
17.7 wt.% of 3-propyl-6-(trans-4-heptylcyclohexyl)-pyridazine,
33.2 wt.% of 3-pentyl-6-(trans-4-pentylcyclohexyl)-pyridazine,
13.2 wt.% of 3-(p-pentylphenyl)-6-(trans-4-propylcyclohexyl)pyridazine.

Basic Mixture B4

12.4 wt.% of 3-propyl-6-(trans-4-ethylcyclohexyl)-pyridazine,
30.0 wt.% of 3-propyl-6-(trans-4-pentylcyclohexyl)-pyridazine,
19.2 wt.% of 3-propyl-6-(trans-4-heptylcyclohexyl)-pyridazine,
38.4 wt.% of 3-pentyl-6-(trans-4-pentylcyclohexyl)-pyridazine.

Basic Mixture B5

21.6 wt.% of 3-heptyl-6-(trans-4-propylcyclohexyl)-pyridazine,
28.0 wt.% of 3-propyl-6-(trans-4-pentylcyclohexyl)-pyridazine,
35.0 wt.% of 3-pentyl-6-(trans-4-pentylcyclohexyl)-pyridazine,
15.4 wt.% of 3-propyl-6-(trans-4-heptylcyclohexyl)-pyridazine.

EXAMPLE 3

Mixture Examples for components A and B together:

Basic Mixture AB1

13.6 wt.% of trans-4-butylcyclohexanecarboxylic acid p-ethoxyphenyl ester,
18.5 wt.% of trans-4-butylcyclohexanecarboxylic acid p-pentyloxyphenyl ester,
12.3 wt.% of trans-4-pentylcyclohexanecarboxylic acid p-methoxyphenyl ester,
18.4 wt.% of trans-4-pentylcyclohexanecarboxylic acid p-propyloxyphenyl ester,
7.7 wt.% of trans-4-(p-pentylphenyl)cyclohexanecarboxylic acid trans-4-propylcyclohexyl ester,
5.3 wt.% of 3-heptyl-6-(trans-4-propylcyclohexyl)-pyridazine,
6.9 wt.% of 3-propyl-6-(trans-4-pentylcyclohexyl)-pyridazine,
8.6 wt.% of 3-pentyl-6-(trans-4-pentylcyclohexyl)-pyridazine,
3.8 wt.% of 3-propyl-6-(trans-4-heptylcyclohexyl)-pyridazine,
4.9 wt.% of 3-(p-pentylphenyl)-6-(trans-4-propylcyclohexyl)pyridazine, cl.p. (N-I) 61.4°–61.8° C.

Basic Mixture AB2

15.4 wt.% of trans-4-butylcyclohexanecarboxylic acid p-ethoxyphenyl ester,
20.6 wt.% of trans-4-butylcyclohexanecarboxylic acid p-pentyloxyphenyl ester, 14.0 wt.% of trans-4-pentylcyclohexanecarboxylic acid p-methoxyphenyl ester,
20.5 wt.% of trans-4-pentylcyclohexanecarboxylic acid p-propyloxyphenyl ester,
5.3 wt.% of 3-heptyl-6-(trans-4-propylcyclohexyl)-pyridazine,
6.9 wt.% of 3-propyl-6-(trans-4-pentylcyclohexyl)-pyridazine,
8.6 wt.% of 3-pentyl-6-(trans-4-pentylcyclohexyl)-pyridazine,
3.8 wt.% of 3-propyl-6-(trans-4-heptylcyclohexyl)-pyridazine,
4.9 wt.% of 3-(p-pentylphenyl)-6-(trans-4-propylcyclohexyl)pyridazine,
cl.p. (N-I) 59.1°–59.6° C.

EXAMPLE 4

Mixture Examples for component C:

Basic Mixture C1

58.7 wt.% of 2-chloro-4-[(p-pentylbenzoyl)oxy]benzoic acid p-(2,2-dicyanovinyl)phenyl ester,
41.3 wt.% of 2-chloro-4-[(p-heptylbenzoyl)oxy]benzoic acid p-(2,2-dicyanovinyl)phenyl ester,
m.p. 87.8°–90.3° C.; cl.p. (N-I) 167.1°–167.6° C.

Basic Mixture C2

32.7 wt.% of 2-chloro-4-/[p-(p'-pentylphenyl)benzoyl]oxy/benzoic acid p-(2,2-dicyanovinyl)phenyl ester,
34.3 wt.% of 2-chloro-4-/[p-(p'-heptylphenyl)benzoyl]oxy/benzoic acid p-(2,2-dicyanovinyl)phenyl ester,
33.0 wt.% of 2-chloro-4-/[p-(trans-4-pentylcyclohexyl)benzoyl]oxy/benzoic acid p-(2,2-dicyanovinyl)phenyl ester,
m.p. 96°–98° C.; cl.p. (N-I) 293° C.

EXAMPLE 5

Mixture Examples for total mixture:

Total Mixture T1

53 wt.% of basic mixture A5,
27 wt.% of basic mixture B4,
7 wt.% of 2-chloro-4-/[p-(4-heptylphenyl)benzoyl]oxy/benzoic acid p-(2,2-dicyano-1-methylvinyl)phenyl ester,
5 wt.% of 2-chloro-4-/[p-(2-(trans-4-heptylcyclohexyl)ethyl)benzoyl]oxy/benzoic acid p-(2,2-dicyano-1-methylvinyl)phenyl ester,
4 wt.% of 2-chloro-4-/[p-(4-heptylphenyl)benzoyl]oxy/benzoic acid p-cyanophenyl ester,
4 wt.% of 2-chloro-4-/[p-(2-(trans-4-heptylcyclohexyl)ethyl)benzoyl]oxy/benzoic acid p-cyanophenyl ester,
m.p. (C-N) <0° C.; cl.p. (N-I) 74.5° C.

Total Mixture T2

46.5 wt.% of basic mixture A5,
8.8 wt.% of trans-4-pentyl-1-(p-propylphenyl)cyclohexane,
3.5 wt.% of 4-(trans-4-pentylcyclohexyl)-4'-[2-(trans-4-butylcyclohexyl)ethyl]biphenyl,
23.7 wt.% of basic mixture B4,
6.1 wt.% of 2-chloro-4-/[p-(4-heptylphenyl)benzoyl]oxy/benzoic acid p-(2,2-dicyano-1-methylvinyl)phenyl ester,
4.4 wt.% of 2-chloro-4-/[p-(2-(trans-4-heptylcyclohexyl)ethyl)benzoyl]oxy/benzoic acid p-(2,2-dicyano-1-methylvinyl)phenyl ester,
3.5 wt.% of 2-chloro-4-/[p-(4-heptylphenyl)benzoyl]oxy/benzoic acid p-cyanophenyl ester,
3.5 wt.% of 2-chloro-4-/[p-(2-(trans-4-heptylcyclohexyl)ethyl)benzoyl]oxy/benzoic acid p-cyanophenyl ester,
m.p. (C-N) <0° C.; cl.p. (N-I) 74.5° C.; $f_c = 1.2$ kHz, $\Delta\epsilon^l = 2.0$ and $\Delta\epsilon^h = -4.2$ at 22° C.

For this mixture there was measured in a rotation cell with 10 μm plate distance in the case of two-frequency control a turn-off time of 9 ms, compared with about 200 ms in the case of conventional control. The attainable increase in the maximum number of multiplexable lines in the case of two-frequency control is dependent on the ratio of the voltage strengths of the high frequency voltage ($V^h$) and of the low frequency voltage ($V^l$). With a 10 kHz high frequency voltage and a 30 Hz low frequency voltage there was attained for $V^h/V^l = 1.0$ a 8.1-fold, for $V^h/V^l = 1.5$ a 15.4-fold and for $V^h/V^l = 2.0$ a 39-fold increase in the multiplex rate in comparison to conventional control with a low frequency voltage.

Total Mixture T3

69.1 wt.% of basic mixture A5
9.1 wt.% of trans-4-pentyl-1-(p-propylphenyl)cyclohexane,
3.6 wt.% of basic mixture B4,
6.4 wt.% of 2-chloro-4-/[p-(4-heptylphenyl)benzoyl]oxy/benzoic acid p-(2,2-dicyano-1-methylvinyl)phenyl ester,
4.6 wt.% of 2-chloro-4-/[p-(2-(trans-4-heptylcyclohexyl)ethyl)benzoyl]oxy/benzoic acid p-(2,2-dicyano-1-methylvinyl)phenyl ester,
3.6 wt.% of 2-chloro-4-/[p-(4-heptylphenyl)benzoyl]oxy/benzoic acid p-cyanophenyl ester,
3.6 wt.% of 2-chloro-4-/p-(2-(trans-4-heptylcyclohexyl)ethyl)benzoyl]oxy/benzoic acid p-cyanophenyl ester,
m.p. (C-N) <0° C.; cl.p. (N-I) 82.2° C.

Total Mixture T4

45.5 wt.% of basic mixture A5
9.1 wt.% of trans-4-pentyl-1-(p-propylphenyl)cyclohexane,
20.9 wt.% of basic mixture B4,
9.1 wt.% of 2-chloro-4-/[p-(4-heptylphenyl)benzoyl]oxy/benzoic acid p-(2,2-dicyano-1-methylvinyl)phenyl ester,
6.4 wt.% of 2-chloro-4-/[p-(2-(trans-4-heptylcyclohexyl)ethyl)benzoyl]oxy/benzoic acid p-(2,2-dicyano-1-methylvinyl)phenyl ester,
4.5 wt.% of 2-chloro-4-/[p-(4-heptylphenyl)benzoyl]oxy/benzoic acid p-cyanophenyl ester,
4.5 wt.% of 2-chloro-4-/[p-(2-(trans-4-heptylcyclohexyl)ethyl)benzoyl]oxy/benzoic acid p-cyanophenyl ester,
m.p. (C-N) <0° C.; cl.p. (N-I) 78.7° C.; $f_c = 1.4$ kHz, $\Delta\epsilon^l = 4.4$ and $\Delta\epsilon^h = -4.2$ at 22° C.

Total Mixture T5

40.0 wt.% of basic mixture A6
8.0 wt.% of 4-[2-(trans-4-pentylcyclohexyl)ethyl]-4'-(trans-4-butylcyclohexyl)-1,1'-ethylenedibenzene,
8.0 wt.% of 4-[2-(trans-4-propylcyclohexyl)ethyl]-4'-(trans-4-butylcyclohexyl)-1,1'-ethylenedibenzene,
24.0 wt.% of basic mixture B4, 8.0 wt.% of 2-chloro-4-/[p-(4-heptylphenyl)benzoyl]oxy/benzoic acid p-(2,2-dicyano-1-methylvinyl)phenyl ester, 5.6 wt.% of 2-chloro-4-/[p-(2-trans-4-heptylcyclohexyl)ethyl)benzoyl]oxy/benzoic acid p-(2,2-dicyano-1-methylvinyl)phenyl ester, 3.2 wt.% of 2-chloro-4-/[p-(4-heptylphenyl)benzoyl]oxy/benzoic acid p-cyanophenyl ester, 3.2 wt.% of 2-chloro-4-/[p-(2-(trans-4-heptylcyclohexyl)ethyl)benzoyl]oxy/benzoic acid p-cyanophenyl ester, m.p. (C-N) <0° C.; cl.p. (N-I) 95.6° C.

Total Mixture T6

The following mixture T6 can be prepared:
60.6 wt.% of basic mixture A10,
18.2 wt.% of basic mixture B5,
21.2 wt.% of basic mixture C2

Total mixture T4 is especially preferred.

The following non-limiting Examples illustrate the preparation of the compounds of formula I in accordance with the invention and of the novel compounds of formula V. Unless otherwise stated, percentages and ratios are given in volume and the temperatures are expressed in degrees Centigrade. Unless otherwise indicated, the Examples were actually performed as written. Room temperature is about 23° C. and the ether is diethyl ether.

EXAMPLE 6

13.1 g of 2-chloro-4-[(p-heptylbenzoyl)oxy]benzoic acid are heated to boiling for 3 hours with 3 hours with 8.3 g of thionyl chloride in 100 ml of benzene. The solvent and excess thionyl chloride are distilled off and the residue is taken up twice in 50 ml of toluene each time and concentrated.

The resulting, crude 2-chloro-4-[(p-heptylbenzoyl)oxy]benzoyl chloride is dissolved in 150 ml of benzene and the solution is then added dropwise to a solution of 5.7 g of p-(2,2-dicyanovinyl)phenol in 125 ml of pyridine. The mixture is stirred overnight at a bath temperature of 65° C., then poured into ice-cold, dilute hydrochloric acid, and extracted with methylene chloride. The extract is washed several times with 3N hydrochloric acid, then washed neutral with water, dried and evaporated. The resulting, crude 2-chloro-4-[(p-heptylbenzoyl)oxy]benzoic acid p-(2,2-dicyanovinyl)phenyl ester is chromatographed on silica gel with toluene/acetone (9:1). The fractions obtained which are almost pure according to thin-layer chromatography are recrystalized a further twice from ethanol/acetone (9:1); m.p. (C-N) 113° C.; cl.p. (N-I) 160.5° C.; yield 9.6 g.

The 2-chloro-4-[(p-heptylbenzoyl)oxy]benzoic acid used as the starting material were prepared as follows:

10.3 g of N,N'-dicyclohexylcarbodiimide are added within 5 minutes to a mixture of 7.0 g of 2-chloro-4-hydroxybenzaldehyde, 9.9 g of p-heptylbenzoic acid and 0.5 g of 4-(dimethylamino)pyridine in 200 ml of methylene chloride. The mixture is stirred at room temperature for a further 2 hours, the precipitated N,N'-dicyclohexylurea is filtered off under suction and the filtrate is evaporated.

The resulting, crude 2-chloro-4-[(p-heptylbenzoyl)oxy]benzaldehyde is dissolved in 350 ml of acetone. Within 40 minutes there are added dropwise thereto 30 ml of Jones' reagent, the mixture warming slightly. The mixture is stirred for a further 1 hour, precipitated inorganic material is then filtered off under suction, the filtrate is diluted with 300 ml of water (the product precipitating), concentrated on a rotary evaporator to about 300 ml and the suspension obtained in suction filtered. The suction filter material is washed three times with 50 ml of 10% aqueous acetone, dried and recrystallized from about 60 ml of benzene. There are obtained 13.8 g of 2-chloro-4-[(p-heptylbenzoyl)oxy]benzoic acid, m.p. 108° C. (nematic).

The following compounds were prepared in an analogous manner:

2-Chloro-4-[(p-propylbenzoyl)oxy]benzoic acid p-(2,2-dicyanovinyl)phenyl ester; m.p. (C-N) 163° C.; cl.p. (N-I) 190° C.

2-Chloro-4-[(p-butylbenzoyl)oxy]benzoic acid p-(2,2-dicyanovinyl)phenyl ester; m.p. (C-N) 140° C.; cl.p. (N-I) 176° C.

2-Chloro-4-[(p-pentylbenzoyl)oxy]benzoic acid p-(2,2-dicyanovinyl)phenyl ester; m.p. (C-N) 87° C. or 104° C. (2 modifications); cl.p. (N-I) 174° C.

2-Chloro-4-[(p-hexylbenzoyl)oxy]benzoic acid p-(2,2-dicyanovinyl)phenyl ester; m.p. (C-N) 86° C. or 94.5° C. (2 modifications); cl.p. (N-I) 162.5° C.

2-Chloro-4-/[p-(trans-4-pentylcyclohexyl)benzoyl]oxy/benzoic acid p-(2,2-dicyanovinyl)phenyl ester; m.p. (C-N) 135.5° C.; cl.p. (N-I) >300° C.

2-Chloro-4-/[p-(trans-4-heptylcyclohexyl)benzoyl]oxy/benzoic acid p-(2,2-dicyanovinyl)phenyl ester; m.p. (C-N) 120.5° C.; cl.p. (N-I) 289.5° C.

2-Chloro-4-/[p-(4-pentylphenyl)benzoyl]oxy/benzoic acid p-(2,2-dicyanovinyl)phenyl ester; m.p. (C-N) 140° C.; cl.p. (N-I) 305.5° C.

2-Chloro-4-/[p-(4-heptylphenyl)benzoyl]oxy/benzoic acid p-(2,2-dicyanovinyl)phenyl ester; m.p. (C-N) 121° C.; cl.p. (N-I) 288° C.

2-Chloro-4-/[p-(4-pentylphenyl)benzoyl]oxy/benzoic acid p-cyanophenyl ester; m.p. (C-N) 137.5° C.; cl.p. (N-I) 308.5° C.

2-Chloro-4-/[p-(4-hexylphenyl)benzoyl]oxy/benzoic acid p-cyanophenyl ester; m.p. (C-N) 139.5° C.; cl.p. (N-I) 296.5° C.

2-Chloro-4-/[p-(4-heptylphenyl)benzoyl]oxy/benzoic acid p-cyanophenyl ester; m.p (C-N) 127.5° C.; cl.p. (N-I) 291° C.

2-Chloro-4-/[p-(trans-4-pentylcyclohexyl)benzoyl]oxy/benzoic acid p-cyanophenyl ester; m.p. (C-N) 116° C.; cl.p. (N-I) 306° C.

2-Chloro-4-/[p-(trans-4-heptylcyclohexyl)benzoyl]oxy/benzoic acid p-cyanophenyl ester; m.p. (C-N) 114° C.; cl.p. (N-I) 292.5° C.

4-/[p-(4-Pentylphenyl)benzoyl]oxy/benzoic acid p-cyanophenyl ester; m.p. (C-N) 158° C., cl.p. (N-I) >350° C.

4-/[p-(4-Heptylphenyl)benzoyl]oxy/benzoic acid p-cyanophenyl ester; m.p. (C-N) 147.5° C.; cl.p. (N-I) >350° C.

EXAMPLE 7

1.03 g of N,N'-dicyclohexylcarbodiimide are added portionwise while stirring within 10 minutes to a suspension of 1.2 g of 4-(5-heptyl-2-pyrimidinyl)benzoic acid, 0.68 g of p-(2,2-dicyanovinyl)phenol and 0.05 g of 4-(dimethylamino)pyridine in 25 ml of methylene chloride. The mixture is subsequently stirred for a further 3 hours, then the precipitated N,N'-dicyclohexylurea is filtered off and the filtrate is evaporated. The resulting, crude 4-(5-heptyl-2-pyrimidinyl)benzoic acid p-(2,2-dicyanovinyl)phenyl ester is recrystallized twice from acetone; m.p. 143.5° C.; cl.p. 216° C.; yield 1.0 g.

The 4-(5-heptyl-2-pyrimidinyl)benzoic acid used as the starting material was prepared as follows:

10.2 g of 4-(5-heptyl-2-pyrimidinyl)benzonitrile are heated to 180° C. for 6 hours in a solution of 7.3 g of potassium hydroxide in 200 ml of ethylene glycol. After cooling, the mixture is diluted with water and acidified with 3N hydrochloric acid. The precipitated product is taken up in methylene chloride. The extract is washed with water, dried over sodium sulphate and evaporated. The crude 4-(5-heptyl-2-pyrimidinyl)benzoic acid is purified by boiling in hexane/ether; m.p. 220.5°–221.5° C.; yield 10.4 g.

The following compound was prepared in an analogous manner:

4-(5-Pentyl-2-pyrimidinyl)benzoic acid p-(2,2-dicyanovinyl)phenyl ester; m.p. 170.5° C.; cl.p. 232° C.

EXAMPLE 8

The compounds of formula I in which Y signifies the 2,2-dicyano-1-methylvinyl group can be prepared in an analogous manner to Example 6.

The p-(2,2-dicyano-1-methylvinyl)phenol used as the starting material were prepared as follows:

A mixture of 92.0 g of p-hydroxyacetophenone, 44.6 g of malonitrile, 5.2 g of ammonium acetate, 8.1 g of acetic acid and 500 ml of toluene was boiled on a water separator for 2 hours while stirring. After cooling, the two-phase mixture was diluted with 700 ml of diethyl ether. The dark red solution was washed four times with 50 ml of saturated sodium chloride solution, dried over sodium sulphate, filtered and evaporated. By fractional crystallization from diisopropyl ether there were obtained 95.7 g of p-(2,2-dicyano-1-methylvinyl)phenol, m.p. 120.5°–121.5° C.

The following compounds were obtained in this manner:

2-Chloro-4-/[p-(4-pentylphenyl)benzoyl]oxy/benzoic acid p-(2,2-dicyano-1-methylvinyl)phenyl ester; m.p. (C-N) 129° C.; transition S-N 122° C. (monotropic); cl.p. (N-I) 279° C.

2-Chloro-4-/[p-(4-hexylphenyl)benzoyl]oxy/benzoic acid p-(2,2-dicyano-1-methylvinyl)phenyl ester; m.p. (C-S) 118.5° C.; transition S-N 130° C.; cl.p. (N-I) 264° C.

2-Chloro-4-/[p-(4-heptylphenyl)benzoyl]oxy/benzoic acid p-(2,2-dicyano-1-methylvinyl)phenyl ester; m.p. (C-S) 115.5° C.; transition S-N 129° C.; cl.p. (N-I) 258° C.

2-Chloro-4/[p-(trans-4-pentylcyclohexyl)benzoyl]oxy/benzoic acid p-(2,2-dicyano-1-methylvinyl)phenyl ester; m.p. (C-N) 141° C.; cl.p. (N-I) 275.5° C.

2-Chloro-4-/[p-(trans-4-heptylcyclohexyl)benzoyl]oxy/benzoic acid p-(2,2-dicyano-1-methylvinyl)phenyl ester; m.p. (C-N) 140.5° C.; cl.p. (N-I) 254.5° C.

4-/[p-(4-Pentylphenyl)benzoyl]oxy/benzoic acid p-(2,2-dicyano-1-methylvinyl)phenyl ester; m.p. (C-N) 179° C.; cl.p. (N-I) 319° C.

4-/[p-(4-Heptylphenyl)benzoyl]oxy/benzoic acid p-(2,2-dicyano-1-methylvinyl)phenyl ester; m.p. (C-N) 144° C.; cl.p. (N-I) 302.5° C.

EXAMPLE 9

Those compounds of formula I in which A is p-[2-(trans-4-alkylcyclohexyl)ethyl]phenyl can be prepared in an analogous manner to Examples 6 and 8.

The p-[2-(trans-4-alkylcyclohexyl)ethyl]benzoic acids used as the starting materials can be prepared as illustrated hereinafter for the heptyl compound:

A solution of 21.3 g of p-[2-(trans-4-heptylcyclohexyl)ethyl]benzonitrile and 14.0 g of potassium hydroxide (85%) in 500 ml of ethylene glycol was heated to boiling for 8 hours (bath temperature 210° C.). After cooling, the mixture was poured into water and acidified with 3N hydrochloric acid. The precipitated p-[2-(trans-4-heptylcyclohexyl)ethyl]benzoic acid was filtered off under suction, washed on the suction filter with water and then taken up in diethyl ether. The solution was dried over sodium sulphate and evaporated. There were obtained 22.9 g of product which was pure according to thin-layer chromatography; m.p. 184°–187° C.; cl.p. 220°–223° C.

The following compounds were prepared in this manner:

2-Chloro-4-/[p-(2-(trans-4-heptylcyclohexyl)ethyl)benzoyl]oxy/benzoic acid p-cyanophenyl ester; m.p. (C-N) 108° C.; cl.p. (N-I) 247.5° C.

2-Chloro-4-/[p-(2-(trans-4-heptylcyclohexyl)ethyl)benzoyl]oxy/benzoic acid p-(2,2-dicyano-1-methylvinyl)phenyl ester; m.p. (C-N) 122° C.; cl.p. (N-I) 216° C.

EXAMPLE 10

Those compounds of formula I in which A is trans-4-[2-(p-R$^1$-phenyl)ethyl]cyclohexyl can be prepared in an analogous manner to Examples 6 and 8.

The trans-4-[2-(p-R$^1$-phenyl)ethyl]cyclohexanecarboxylic acids used as the starting materials can be prepared as illustrated hereinafter for the pentyl compound:

(a) A mixture of 2.51 g of (p-pentylphenyl)methyl-triphenylphosphonium bromide and 615 mg of 4-cyanocyclohexanecarboxaldehyde (cis/trans mixture about 1:1) in 30 ml of t-butyl methyl ether was placed at 0° C. in a sulphonation flask while gassing with argon, the mixture was treated within 2 minutes with 673 mg of solid potassium t-butylate and the mixture was subsequently stirred at 0° C. for a further 1.5 hours. The red-brown, heterogeneous mixture was then poured into 100 ml of water and extracted three times with 100 ml of diethyl ether each time. The organic phases were washed twice with 50 ml of water each time and once with 50 ml of saturated sodium chloride solution, dried over magnesium sulphate and concentrated. The residue was suspended in 150 ml of hexane, freed from precipitated triphenylphosphine oxide by filtration (back-washing with hexane) and the filtrate was concentrated. Low-pressure chromatography (0.4 bar) of the resulting oil (1.36 g) on silica gel with 3% ethyl acetate/petroleum ether as the eluant gave 1.02 g (81%) of 4-[2-(p-pentylphenyl)ethenyl]cyclohexanecarbonitrile as a colourless oil; Rf values of this isomer mixture (10% ethyl acetate/petroleum ether): 0.27 and 0.36.

(b) 956 mg of the 4-[2-(p-pentylphenyl)ethenyl]cyclohexanecarbonitrile obtained were dissolved in 50 ml of toluene in a sulphonation flask, the solution was treated with 150 mg of palladium/carbon (10%) and the mixture was hydrogenated at normal pressure and room temperature until the hydrogen uptake came to a standstill (about 30 minutes). Filtration of the mixture (back-washing with toluene), concentration of the filtrate and low-pressure chromatography (0.4 bar) of the residue (890 mg) on silica gel with 5% ethyl acetate/petroleum ether gave 788 mg (82%) of 4-[2-(p-pentylphenyl)e- thyl]cyclohexanecarbonitrile as a viscous, colourless oil. Although in the thin-layer chromatogram using different solvent systems as the eluant there appeared only a single spot, with gas-chromatographic analysis and NMR spectroscopic analysis showed this material to be a cis/trans isomer mixture (about 1:3). Two-fold crystallization of this material from pentane at −20° C. finally yielded trans-4-[2-(p-pentylphenyl)ethyl]cyclohexanecarbonitrile of sufficient purity (98.8% of trans compound and 1.2% of cis compound according to gas-chromatographic analysis); m.p. 22.4° C.; cl.p. (N-I) −14.1° C.

(c) A mixture of 567 mg of trans-4-[2-(p-pentylphenyl)ethyl]cyclohexanecarbonitrile and 20 ml of a 10:1 mixture of 2N potassium hydroxide and ethanol was heated to reflux for 2 hours while gassing with argon in a round flask fitted with a reflux condenser. The cooled mixture was diluted with 20 ml of water and extracted twice with 30 ml of diethyl ether each time. The separated aqueous phase was acidified with about 20 ml of 2N sulphuric acid and extracted three times with 50 ml of diethyl ether each time. The organic phases were washed twice with 50 ml of saturated sodium chloride solution each time, dried over magnesium sulphate and concentrated. There were obtained 490 mg (81%) of trans-4-[2-(p-pentylphenyl)ethyl]cyclohexanecarboxylic acid as colourless crystals which were purified further by recrystallization from hexane.

EXAMPLE 11

Those compounds of formula I in which A is trans-4-[2-(trans-4-alkylcyclohexyl)ethyl]-cyclohexyl can be prepared in an analogous manner to Examples 6 and 8.

The trans-4-[2-(trans-4-alkylcyclohexyl)ethyl]cyclohexanecarboxylic acids used as the starting materials can be prepared as illustrated hereinafter for the pentyl compound:

(a) 3.79 g of lithium aluminium hydride were placed in 100 ml of absolute tetrahydrofuran while gassing with argon and treated within 30 minutes with a solution of 19.83 g of trans-4-pentylcyclohexanecarboxylic acid in 100 ml of absolute tetrahydrofuran. After completion of the addition, the mixture was heated to reflux for 1 hour, then cautiously added to 200 ml of 2N hydrochloric acid and extracted three times with 100 ml of diethyl ether each time. The organic phases were washed with 100 ml of saturated sodium carbonate solution, dried over potassium carbonate and concentrated. Distillation of the residue (19.2 g) gave in the main run 17.7 g (96%) of (trans-4-pentylcyclohexyl)methanol as a colourless oil (purity 99.9%); b.p. 89° C./0.2 mmHg.

(b) A solution of 3.69 g of (trans-4-pentylcyclohexyl)methanol and 5.51 g of triphenylphosphine in 70 ml of methylene chloride at −30° C. was placed under argon gasification and treated portionwise within 15 minutes with 7.30 g of solid tetrabromomethane in such a manner that the internal temperature did not exceed −20° C. After completion of the addition, the cooling bath was removed and the mixture was stirred for a further 18 hours with gradual warming to room temperature. The mixture was then concentrated on a rotary evaporator and the resulting, semi-crystalline residue was triturated with 200 ml of warm hexane, filtered and the concentrated filtrate was chromatographed with hexane on a column of silica gel. There were obtained 4.79 g (97%) of trans-1-(bromomethyl)-4-pentylcyclohexane as a colourless liquid which was purified further by distillation; b.p. 82° C./0.08 mmHg.

(c) A mixture of 18.9 g of 1-methoxy-3-(trimethylsilyloxy)-1,3-butadiene [S. Danishefsky et al, J. Amer. Chem. Soc. 96, (1974) 7807], 6.4 g of acrylonitrile, 100 mg of dibenzoyl peroxide and 50 ml of benzene was heated to reflux for 23 hours while gassing with argon. After cooling, the liquid constituents (benzene and excess acrylonitrile) were removed on a rotary evaporator and the residue was heated to boiling for 2 hours in 100 ml of tetrahydrofuran/1N hydrochloric acid (4:1). The cooled mixture was subsequently extracted three times with 100 ml of methylene chloride each time. The organic phases were washed twice with 100 ml of water each time and once with 100 ml of saturated sodium chloride solution, dried over magnesium sulphate and concentrated. There were obtained 10.3 g of a yellow oil which consisted of 87.9% of 4-cyano-3-cyclohexen-1-one, of 4.1% of 4-cyano-2-cyclohexen-1-one and of 2.7% of trans-4-cyano-3-methoxycyclohexanone (an intermediately occuring hydrolysis product). Bulb-tube distillation (130°–140° C./0.27–0.15 mmHg) of the resulting oil gave 7.64 g of a mixture of 4-cyano-3-cyclohexen-1-one and 4-cyano-2-cyclohexen-1-one as an orange, crystallizing oil. This was dissolved in 70 ml of ethanol and hydrogenated in the presence of 764 mg of 10% palladium/carbon at normal pressure (hydrogen uptake 1425 ml). After filtration of the catalyst, washing with methylene chloride, concentration of the filtrate and bulb-tube distillation (130°–150° C./0.11 mmHg), there were obtained 5.45 g (70%) of 4-cyanocyclohexanone as a colourless oil; Rf value (toluene/ethyl acetate 3:1): 0.25.

(d) 9.6 g of triphenyl(methoxymethyl)phosphonium chloride were suspended in 50 ml of t-butyl methyl ether while gassing with argon and treated portionwise at −10° C. with 3.39 g of solid potassium t-butylate. After completion of the addition, the mixture was stirred at 0° to 5° C. for a further 30 minutes and then the deep orange, partially heterogeneous mixture was treated dropwise within 10 minutes with a solution of 2.30 g of 4-cyanocyclohexanone in 20 ml of t-butyl methyl ether. In so doing, the internal temperature should not exceed 5° C. After completion of the addition, the now yellow-orange mixture was warmed to 25° C. and stirred for a further 2 hours. 50 ml of a 2% sodium hydrogen carbonate solution were subsequently added and the separated, aqueous phase was extracted twice with 50 ml of diethyl ether each time. The organic phases were washed with 50 ml of saturated sodium chloride solution, dried over potassium carbonate and concentrated. The residual, semi-crystalline, orange oil was triturated with 400 ml of hexane, cooled to −20° C. and freed from precipitated triphenylphosphine oxide by filtration (rinsing with cold hexane). Low-pressure chromatography (0.4 bar) of the concentrated residue on silica gel using 10% ethyl acetate/petroleum ether as the eluant gave 1.60 g (56%) of 4-(methoxymethylene)cyclohexanecarbonitrile as a colourless oil (purity 97%).

(e) The 4-(methoxymethylene)cyclohexanecarbonitrile obtained was heated to reflux for 1.5 hours in 100 ml of tetrahydrofuran/0.2N hydrochloric acid (4:1). The cooled mixture was then poured into 50 ml of water and extracted three times with 50 ml of diethyl ether each time. The organic phases were washed with 50 ml of water and 50 ml of saturated sodium hydrogen carbonate solution, dried over magnesium sulphate and concentrated. There were obtained 1.35 g (94%) of a colourless oil which, according to gas-chromatographical analysis, contained 92% of a mixture of the cis- and trans-4-cyanocyclohexanecarboxaldehydes (in the ratio of about 1:1). This material was used in the following reduction without additional purification. Rf values (toluene/ethyl acetate 3:1): cis-4-cyanocyclohexanecarboxaldehyde 0.36, trans-4-cyanocyclohexanecarboxaldehyde 0.32.

(f) A solution of 1.34 g of 4-cyanocyclohexanecarboxaldehyde (cis/trans mixture) in 40 ml of 0.1N methanolic potassium hydroxide solution was treated portionwise at 0° C. while gassing with argon with 378 mg of solid sodium borohydride. After completion of the addition, the mixture was stirred at 0° C. for a further 20 minutes, 50 ml of water were then added and the mixture obtained was extracted three times with 50 ml of methylene chloride each time. The organic phases were washed twice with 50 ml of water each time, dried over magnesium sulphate and concentrated. Low-pressure chromatography (0.4 bar) of the residual oil on silica gel with chloroform/ethyl acetate (1:1) gave 1.22 g (90%) of 4-(hydroxymethyl)cyclohexanecarbonitrile (likewise as an about 1:1 mixture of the two epimers) as a colourless, viscous oil. This material was used in the following tosylation without further purification. Rf value of 4-(hydromethyl)cyclohexanecarbonitrile (chloroform/ethyl acetate 1:1)0.29 (longish spot).

(g) A solution of 1.20 g of the 4-(hydroxymethyl)cyclohexanecarbonitrile obtained in 5 ml of pyridine was treated portionwise with 2.46 g of tosyl chloride at room temperature and while gassing with argon. After stirring at room temperature for 3.5 hours (formation of a white precipitate), the mixture, cooled to 0° C., was treated with about 2 ml of water, cautiously made acid with about 7 ml of concentrated hydrochloric acid and extracted three times with 30 ml of diethyl ether each time. The organic phases were washed with 50 ml of water and 50 ml of saturated sodium chloride solution, dried over magnesium sulphate and concentrated, there remaining behind 2.31 g of a semi-crystalline oil. Low-pressure chromatography (0.5 bar) on 480 g of silica gel using 30% ethyl acetate/petroleum ether as the eluant gave 1.06 g (42%) of trans-4-(tosyloxymethyl)cyclohexanecarbonitrile as a colourless, crystallizing oil (m.p. 84°–85° C.) and 1.03 g (41%) of cis-4-(tosyloxymethyl)cyclohexanecarbonitrile as a colourless, viscous oil. Rf values (30% ethyl acetate/petroleum ether): trans product 0.25, cis product 0.20.

(h) 121 mg of magnesium shavings were covered with 3 ml of absolute tetrahydrofuran while gassing with argon, treated with a crystal of iodine and then treated at reflux temperature with a solution of 989 mg of trans-1-(bromomethyl)-4-pentylcyclohexane [from paragraph b)] in 7 ml of absolute tetrahydrofuran. After completion of the addition, the mixture was heated to reflux for a further 45 minutes.

Subsequently, the mixture, cooled to −78° C., was treated with 0.7 ml of a 0.1N solution of dilithium tetrachlorocuprate [prepared according to M. Tamura et al, Synthesis 1971, 303] in tetrahydrofuran and with a solution of 587 mg of trans-4-(tosyloxymethyl)cyclohexanecarbonitrile in 9 ml of absolute tetrahydrofuran. The mixture, warmed to −15° C., was stirred for a further 21 hours, then treated with about 10 ml of saturated ammonium chloride solution and extracted three times with 50 ml of diethyl ether each time. The organic phases were washed with 50 ml of saturated sodium chloride solution, dried over magnesium sulphate and concentrated. Low-pressure chromatography (0.5 bar) of the residue on silica gel with 3% ethyl acetate/petroleum ether gave, besides a large amount of coupling product of trans-1-(bromomethyl)-4-pentylcyclohexane, 164 mg (28.8%) of trans-4-[2-(trans-4-pentylcyclohexyl)ethyl]cyclohexanecarbonitrile [353 mg of trans-4-(tosyloxymethyl)cyclohexanecarbonitrile could be recovered with 30% ethyl acetate/petroleum ether]. A single recrystallization from 5 ml of methanol yielded 96 mg of trans-4-[2-(trans-4-pentylcyclohexyl)ethyl]cyclohexanecarbonitrile as colourless crystals (purity 99.98%); solid-solid transition 39.3° C.; m.p. 56.3° C.; cl.p. 72.3° C. (nematic).

(i) The nitrile obtained can be saponified to give trans-4-[2-(trans-4-pentylcyclohexyl)ethyl]cyclohexanecarboxylic acid in an analogous manner to Example 10(c) with 2N potassium hydroxide and ethanol under reflux.

We claim:

1. A liquid crystalline mixture for electro-optical devices which are operated according to the 2-frequency matrix addressing procedure, said mixture consisting of three components A, B and C, each of which have one or more compounds, component A amounting to at least about 30 wt. % of the total mixture, having a viscosity of at most 40 cp, a clearing point of at least about 40° C. and a dielectric anisotropy between about −2 and about +1 both above and below the cross-over frequency of the total mixture; component B being about 3–40 wt. % of the total mixture, and having a dielectric anisotropy below about −2 both above and below the cros-over frequency of the total mixture; and a component C being about 5–40 wt. % of the total mixture, and having a dielectric anisotropy above about +10 at a frequency below the cross-over frequency, and having a negative dielectric anisotropy above the cross-over frequency and, a clearing point of at least about 100° C. and a cross-over frequency in the total mixture of at most about 15 kHz at 20° C.

2. A liquid crystalline mixture comprising:
(a) a compound or mixture of compounds amounting to at least about 30 wt. % of the total mixture, and having a viscosity of at most about 40 cp, a clearing point of at least about 40° C. and a dielectric anisotropy between about −2 and about +1 both above and below the cross-over frequency of the total mixture;
(b) a compound or mixture of compounds being about 3–40 wt. % of the total mixture, and having a dielectric anisotropy below about −2 both above and below the cross-over frequency of the total mixture;
(c) a compound or mixture of compounds being about 5–40 wt. % of the total mixture, and having a dielectric anisotropy above about +10 at a frequency below the cross-over frequency and a negative dielectric anisotropy above the cross-over frequency, and a clearing point of at least about 100° C.; and said total liquid crystalline mixture having a cross-over frequency of at most about 15 kHz at 20° C.

3. A liquid crystalline mixture comprising three components A, B and C, each of which have one or more compounds, component A amounting to at least about 30 wt. % of the total mixture, and having a viscosity of at most 40 cp, a clearing point of at least about 40° C. and a dielectric anisotropy between about −2 and +1 both above and below the cross-over frequency of the total mixture; component B being about 3–40 wt. % of the total mixture, and having a dielectric anisotropy below about −2 both above and below the cross-over frequency of the total mixture; and a component C being about 5–40 wt. % of the total mixture, and having a dielectric anisotropy above about +10 at a frequency below the cross-over frequency and a negative dielectric anisotropy above the cross-over frequency and, a clearing point of at least about 100° C. and said resulting liquid crystalline mixture having a cross-over frequency of at most about 15 kHz at 20° C.

4. The liquid crystalline mixture of claim 3 wherein the resulting liquid crystalline mixture has a cross-over frequency of at most about 10 kHz at 20° C.

5. The liquid crystalline mixture of claim 3 wherein component C has one or more compounds of the formula

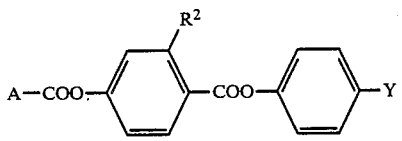

I wherein $R^2$ is hydrogen, fluorine, chlorine, bromine or cyano, Y is 2,2-dicyanovinyl, 2,2-dicyano-1-methylvinyl or cyano, A is p-$R^1$-phenyl, trans-4-$R^1$-cyclohexyl, 4'-$R^1$-4-biphenylyl, p-(trans-4-$R^1$-cyclohexyl)phenyl, p-(5-$R^1$-2-pyrimidinyl)phenyl, p-[2-(p'-$R^1$-phenyl)ethyl]phenyl, p-[2-(trans-4-$R^1$-cyclohexyl)ethyl]phenyl, trans-4-[2-(p-$R^1$-phenyl)ethyl]cyclohexyl or trans-4-[2-(trans-4-$R^1$-cyclohexyl)ethyl]cyclohexyl, and $R^1$ is straight-chain alkyl of 1 to 12 carbon atoms or when A is p-$R^1$-phenyl, 4'-$R^1$-4-biphenylyl, p-[2-(p'-$R^1$-phenyl)ethyl]phenyl or trans-4-[2-(p-$R^1$-phenyl)ethyl]cyclohexyl, $R^1$ can also be straight-chain alkoxy of 1 to 12 carbon atoms.

6. The liquid crystalline mixture of claim 5 wherein $R^2$ is cyano or chlorine.

7. The liquid crystalline mixture of claim 6 wherein $R^2$ is chlorine.

8. The liquid crystalline mixture of claim 5 wherein $R^1$ is straight-chain alkyl of 1 to 12 carbon atoms.

9. The liquid crystalline mixture of claim 5 wherein Y is cyano or 2,2-dicyano-1-methylvinyl.

10. The liquid crystalline mixture of claim 5 wherein A is 4'-alkyl-4-biphenylyl, p-(trans-4-alkylcyclohexyl)phenyl or p-[2-(trans-4-alkylcyclohexyl)ethyl]phenyl.

11. The liquid crystalline mixture of claim 3 wherein component B has one or more compounds of the formula

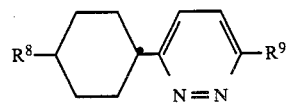

XXV wherein $R^8$ is straight-chain alkyl of 1 to 12 carbon atoms, $R^9$ is alkyl, alkoxy, p-alkylphenyl, p-alkoxyphenyl or trans-4-alkylcyclohexyl and the alkyl and alkoxy groups in $R^9$ each are straight-chain groups of 1 to 10 carbon atoms.

12. The liquid crystalline mixture of claim 3, comprising trans-4-pentyl-1-(p-propylphenyl)cyclohexane; 3-propyl-6-(trans-4-ethylcyclohexyl)-pyridazine; 3-propyl-6-(trans-4-pentylcyclohexyl)pyridazine; 3-propyl-6-(trans-4-heptylcyclohexyl)-pyridazine; 3-pentyl-6-(trans-4-pentylcyclohexyl)pyridazine; 2-chloro-4-/[p-4-heptylphenyl)benzoyl]oxy/benzoic acid p-(2,2-dicyano-1-methylvinyl)phenyl ester; 2-chloro-4-/[p-(2-(trans-4-heptylcyclohexyl)-ethyl)benzoyl]oxy/benzoic acid p-(2,2-dicyano-1-methylvinyl)phenyl ester; 2-chloro-4-/[p-(4-heptylphenyl)benzoyl]oxy/benzoic acid p-cyanophenyl ester; 2-chloro-4-/[p-(2-trans-4-heptylcyclohexyl)ethyl)benzoyl]oxy/benzoic acid p-cyano-phenyl ester; trans-4-butylcyclohexanecarboxylic acid p-ethoxyphenyl ester; trans-4-butylcyclohexanecarboxylic acid p-pentyloxyphenyl ester; trans-4-pentylcyclohexanecarboxylic acid p-methoxyphenyl ester; trans-4-pentylcyclohexanecarboxylic acid p-propyloxyphenyl ester; 2-(trans-4-pentylcyclohexyl)-1-(p-ethoxyphenyl)ethane.

13. An electro-optical cell operating according to the 2 frequency matrix addressing procedure having therein a liquid crystalline mixture comprising three components, A, B and C, each of which have one or more compounds, component A amounting to at least about 30 wt. % of the total mixture, and having a viscosity of at most about 40 cp, a clearing point of at least about 40° C. and a dielectric anisotropy between about −2 and +1 both above and below the cross-over frequency of the total mixture; component B being about 3–40 wt. % of the total mixture, and having a dielectric anisotropy below about −2 both above and below the cross-over frequency of the total mixture; and component C being about 5–40 wt. % of the total mixture, and having a dielectric anisotropy above about +10 at a frequency below the cross-over frequency and a negative dielectric anisotropy above the cross-over frequency and, a clearing point of at least about 100° C. and said resulting liquid crystalline mixture having a cross-over frequency of at most about 15 kHz at 20° C.

* * * * *

UNITED STATES PATENT AND TRADEMARK OFFICE
CERTIFICATE OF CORRECTION

PATENT NO. : 4,783,280
DATED : November 8, 1988
INVENTOR(S) : Martin Petrzilka, Martin Schadt, Alois Villiger It is certified that error appears in the above-identified patent and that said Letters Patent is hereby corrected as shown below:

Title page, under the caption

[30]   Foreign Application Priority Data

"Feb. 26, 1982 [CH] Switzerland ..........1883/82"

should read as follows:

-- Mar. 26, 1982 [CH] Switzerland ..........1883/82 --

Signed and Sealed this

Twenty-first Day of March, 1989

Attest:

DONALD J. QUIGG

Attesting Officer      Commissioner of Patents and Trademarks